United States Patent [19]

Matsuda

[11] Patent Number: 5,212,640
[45] Date of Patent: May 18, 1993

[54] AUTOMOTIVE CONTROL SYSTEM EMPLOYING ACCELERATION SENSOR AND FAULT DETECTING SYSTEM THEREFOR

[75] Inventor: Toshiro Matsuda, Kanagawa, Japan

[73] Assignee: Nissan Motor Company, Limited, Japan

[21] Appl. No.: 404,527

[22] Filed: Sep. 8, 1989

[30] Foreign Application Priority Data

Sep. 9, 1988 [JP] Japan ................................ 63-118413

[51] Int. Cl.$^5$ ........................ G06F 15/20; B60K 26/00
[52] U.S. Cl. ........................... 364/424.03; 364/426.03; 180/197
[58] Field of Search ...................... 364/424.04, 424.05, 364/426.01, 426.02, 426.03, 550, 551.01, 424.03; 180/197, 248, 249; 303/95, 103

[56] References Cited

U.S. PATENT DOCUMENTS

| | | | |
|---|---|---|---|
| 4,667,176 | 5/1987 | Matsuda | 340/52 F |
| 4,841,446 | 6/1989 | Leiber et al. | 364/426.02 |
| 4,849,891 | 7/1989 | Krohn et al. | 364/426.03 |
| 4,926,333 | 5/1990 | Hashiguchi et al. | 364/426.02 |

FOREIGN PATENT DOCUMENTS 3644139 4/1986 Fed. Rep. of Germany.

Primary Examiner—Parshotam S. Lall
Assistant Examiner—Thomas S. Auchterlonie
Attorney, Agent, or Firm—Lowe, Price, LeBlanc & Becker

[57] ABSTRACT

An automotive activity control system controls vehicular driving activity, such as power distribution for delivering driving torque generated by prime mover of the vehicle to primary and secondary driving wheels, vehicular braking operation for preventing the road wheels from causing skidding during braking operation, vehicular attitude. The control system includes acceleration sensor, such as a longitudinal acceleration sensor, a lateral acceleration sensor, a vertical acceleration sensor for monitoring a vehicular driving behavior and providing control parameter for activity control. The control system detects faulty condition of the acceleration sensor for taking place fail-safe operation. Particularly, the control system detects faulty condition of the acceleration sensor to generate sensor signal representative of abnormal or impossible acceleration resulting in malfunction of activity control.

26 Claims, 9 Drawing Sheets

AUTOMOTIVE CONTROL SYSTEM EMPLOYING ACCELERATION SENSOR AND FAULT DETECTING SYSTEM THEREFOR

BACKGROUND OF THE INVENTION

1. Field of the Invention

The present invention relates generally to a control system for an automotive vehicle which controls vehicular activity for achieving improved vehicle driving performance with satisfactorily high driving stability and riding comfort. More specifically, the invention relates to an automotive control system employing an acceleration sensor, such as a lateral acceleration sensor, a longitudinal acceleration sensor, a vertical acceleration sensor and so forth, and a system for monitoring operation of the acceleration sensor in order to detect failure for alarming and/or taking place fail-safe operation.

2. Description of the Background Art

In the recent years, various electronic control systems have been developed, such as an anti-skid brake control system for controlling braking pressure in an automotive brake system for optimizing vehicular braking performance, power distribution control system for adjusting distribution of driving torque for front and rear wheels, a suspension control system for controlling suspension characteristics for effectively absorbing road shock and controlling attitude of the vehicular body. Such control systems employ various acceleration sensors, such as a lateral acceleration sensor monitoring acceleration magnitude exerted on the vehicular body in a direction lateral to a longitudinal axis of the vehicular body, a longitudinal acceleration sensor for monitoring acceleration magnitude exerted along the longitudinal axis, a vertical acceleration sensor and so forth. Control systems employing such acceleration sensors have been employed in Japanese Patent First (unexamined) Publications (Tokkai) Showa 51-6305, 61-169326 and 63-130418.

The vehicular activity control systems, such as that listed above, take accelerations, e.g. lateral acceleration, longitudinal acceleration, vertical acceleration and so forth, as one of typical and essential control parameters. Therefore, failure of acceleration sensors providing such control parameters tends to result in failure of control. Concerning type of failures possibly caused in the acceleration sensors, there are two types of possible failures to be caused. One of the failures is so-called "zero-output failure" in which the acceleration sensor outputs acceleration indicative signals representative of acceleration magnitude of zero despite noticeable magnitude of acceleration. The other is so-called "abnormal-output failure" in which the acceleration sensor outputs abnormal value of acceleration indicative signals irrespective of actual magnitude of acceleration. The former zero-output failure may not cause a substantial problem in vehicular activity control though it naturally causes degradation of control performance in a certain level. On the other hand, abnormal-output failure may result in malfunction of the control system and thus cause serious problems.

In the existing technologies, abnormal-output failure of the acceleration sensors has been detected by comparing the sensor outputs with predetermined reference values which represent possible maximum accelerations. Namely, in case of the automotive control systems, the possible maximum longitudinal acceleration magnitude may not exceed road/tire friction upon braking; the possible maximum lateral acceleration may be exerted during cornering. Therefore, by setting the possible maximum longitudinal acceleration at the road/tire friction and the possible maximum lateral acceleration at the lateral acceleration at the cornering, abnormally great acceleration indicative sensor outputs can be detected. Such conventionally employed failure monitoring technologies are not at all complete because they can not detect abnormal-output failure when failure occurs at acceleration magnitude far below the aforementioned possible maximum value as the reference level.

SUMMARY OF THE INVENTION

Therefore, it is an object of the present invention to provide an automotive activity control system with a failure detecting system which can effectively detect failure of an acceleration sensor at any range of acceleration magnitude.

In order to accomplish aforementioned and other objects, an automotive activity control system controls vehicular driving activity, such as power distribution for delivering driving torque generated by a prime mover of the vehicle to primary and secondary driving wheels, vehicular braking operation for preventing the road wheels from causing skidding during braking operation, and vehicular attitude. The control system includes an acceleration sensor, such as a longitudinal acceleration sensor, a lateral acceleration sensor, and a vertical acceleration sensor for monitoring a vehicular driving behaviour and for providing a control parameter for activity control. The control system detects faulty condition of the acceleration sensor to ensure fail-safe operation. Particularly, the control system detects faulty condition of the acceleration sensor to generate a sensor signal representative of abnormal or impossible acceleration which would result in malfunction of activity control.

According to one aspect of the invention, an automotive control system employing lateral acceleration exerted on a vehicular body, as monitored by a lateral acceleration sensor and longitudinal acceleration exerted on a vehicular body, as monitored by a longitudinal acceleration sensor, as control parameters, a fault detecting system for detecting failure of the lateral and longitudinal acceleration sensors, comprises:

first means receiving a lateral acceleration indicative signal output from the lateral acceleration sensor and receiving a longitudinal acceleration indicative signal output from a longitudinal acceleration sensor for deriving a data value based on both of the lateral acceleration indicative signal and the longitudinal acceleration indicative signal;

second means for comparing the data value with a predetermined reference value for detecting a faulty state of one of the lateral and longitudinal acceleration sensors and for producing a faulty state indication signal.

The first means may derive the data value by summing the lateral and longitudinal acceleration indicative signals. In the alternative, the first means may derive the data value by deriving the sum of the square of respective lateral and longitudinal acceleration indicative signal values and deriving the square root of the sum.

In either case, the second means may detect occurrence of failure of the lateral and longitudinal acceleration sensors when the data value is greater than the reference value. Preferably, the fault detecting system further comprises a timer means triggered by the faulty state indicative signal for outputting a fault indicative output signal when the faulty state indicative signal is maintained for a predetermined period of time.

In the preferred construction the fault detecting system may further comprise a third means deriving a sum value of the lateral and longitudinal acceleration indicative signals, a fourth means for comparing the sum value with the reference value for deriving a secondary faulty state indicative signal, and an AND gate receiving the faulty state indicative signals from the second means and third means for outputting a faulty state indicative gate signal when the AND condition is established. Also, the fault detecting system may further comprise a timer means triggered by the faulty state indicative gate signal for outputting a fault indicative output signal when faulty state indicative signal is maintained for a predetermined period of time.

According to another aspect of the invention, an automotive activity control system for controlling vehicular driving behaviour affected by accelerations exerted on the vehicular body, comprises:

a first acceleration sensor for monitoring first acceleration exerted on the vehicular body in a first direction to produce a first acceleration indicative signal;

a second acceleration sensor for monitoring second acceleration exerted on the vehicular body in a second direction which is different from the first direction to produce a second acceleration indicative signal;

a vehicular driving condition sensor for monitoring vehicular driving condition for producing a control parameter indicative signal representative of vehicular driving parameters affecting for vehicular driving behaviour;

first means provided for controlling operation of a vehicular component for controlling vehicular driving behaviour according to the first acceleration indicative signal, a second acceleration indicative signal and the control parameter indicative signal, the first means being operable in a first normal control mode and a second fail-safe mode;

second means for receiving the first acceleration indicative signal output from the first acceleration sensor and the second acceleration indicative signal output from the second acceleration sensor for deriving a data value based on both of the first acceleration indicative signal and the second acceleration indicative signal;

third means for comparing the data value with a predetermined reference value for detecting faulty state of one of the first and second acceleration sensors for commanding fail-safe mode operation of the first means.

According to a further aspect of the invention, a power train control system for adjusting transmitting output torque of a prime mover of the vehicle distributed to front and rear wheels, comprises:

a first acceleration sensor for monitoring first acceleration exerted on the vehicular body in a first direction to produce a first acceleration indicative signal;

a second acceleration sensor for monitoring second acceleration exerted on the vehicular body in a second direction which is different from the first direction to produce a second acceleration indicative signal;

a third sensor for monitoring preselected vehicle driving parameters represetative of vehicular driving condition as power train control parameters and produces parameter indicative signals;

first means provided for controlling operation for adjusting distribution rate of the output torque on the basis of at least selected one of the first and second acceleration indicative signals and the parameter indicative signals, the first means being operable in a first normal control mode and a second fail-safe mode;

second means for receiving the first acceleration indicative signal output from the first acceleration sensor and the second acceleration indicative signal output from the second acceleration sensor for deriving a data value based on both of the first acceleration indicative signal and the second acceleration indicative signal;

third means for comparing the data value with a predetermined reference value for detecting faulty state of one of the first and second acceleration sensors for commanding fail-safe mode operation of the first means.

Preferably, the third sensor means includes a first wheel speed sensor, monitoring wheel speed of a front wheel to produce a first wheel speed indicative signal, and a second wheel speed sensor, monitoring wheel speed at the rear wheel to produce a second wheel speed indicative signal, and the first means operates for adjusting the output torque to be distributed to a secondary wheel to deliver the output torque to a primary driving wheel for driving the vehicle in two wheel driving mode when a difference between the first and second wheel speed indicative signal values is zero and for increasing ratio of the output torque to be delivered to the secondary driving wheel according to increasing of the difference, in the first normal mode, and for gradually decreasing the delivery ratio of the output torque to the secondary driving wheel to zero in the second fail-safe mode. On the other hand, the first acceleration sensor monitors lateral acceleration exerted on the vehicular body and the first means includes means for generating a gain which is variable to be decreased according to increasing of the first acceleration indicative signal value for reducing delivery ratio of the output torque to the secondary driving wheel according to increasing of magnitude of the lateral acceleration.

In the particular application, the control system may be associated with an anti-skid brake control system for detecting active state of the latter to switch operation mode into a third mode in which distribution of the output torque is determined on the basis of an engine revolution speed.

According to a still further aspect of the invention, a power train control system for adjusting transmitting output torque of a prime mover of the vehicle distributed to front and rear wheels, and the power train control system incorporating an anti-skid brake control system for adjusting braking pressure in wheel cylinders for controlling wheel slippage during braking operation at a predetermined optimum level, comprises:

a third sensor for monitoring preselected vehicle driving parameter representative of vehicular driving condition as power train control parameters and producing parameter indicative signals;

first means provided for controlling operation for adjusting distribution rate of the output torque on the basis the parameter indicative signals, the first means being operable in a first mode for deriving distribution of the output torque on the basis of the parameter indicative signals including a wheel speed difference between primary and secondary driving wheels, and a second mode for deriving the distribution ratio of the output torque on the basis of an engine revolution speed; and second means for commanding the first mode operation of the first means while the anti-skid brake control is held in inactive state and commanding the second mode operation while the anti-skid brake control system is active.

Preferably, the control system may further comprise a first acceleration sensor for monitoring first acceleration exerted on the vehicular body in a first direction to produce a first acceleration indicative signal, a second acceleration sensor for monitoring second acceleration exerted on the vehicular body in a second direction which is different from the first direction to produce a second acceleration indicative signal, and third means for receiving the first acceleration indicative signal output from the first acceleration sensor and the second acceleration indicative signal output from the second acceleration sensor for deriving a data value based on both of the first acceleration indicative signal and the second acceleration indicative signal, and a fourth means for comparing the data value with a predetermined reference value for detecting faulty state of one of the first and second acceleration sensors for commanding fail-safe mode operation for reducing distribution ratio of the output torque to the secondary wheel to zero according to expansion of elapsed time.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiments, but are for explanation and understanding only.

In the drawings.

DESCRIPTION OF THE PREFERRED EMBODIMENTS

Figure 1:
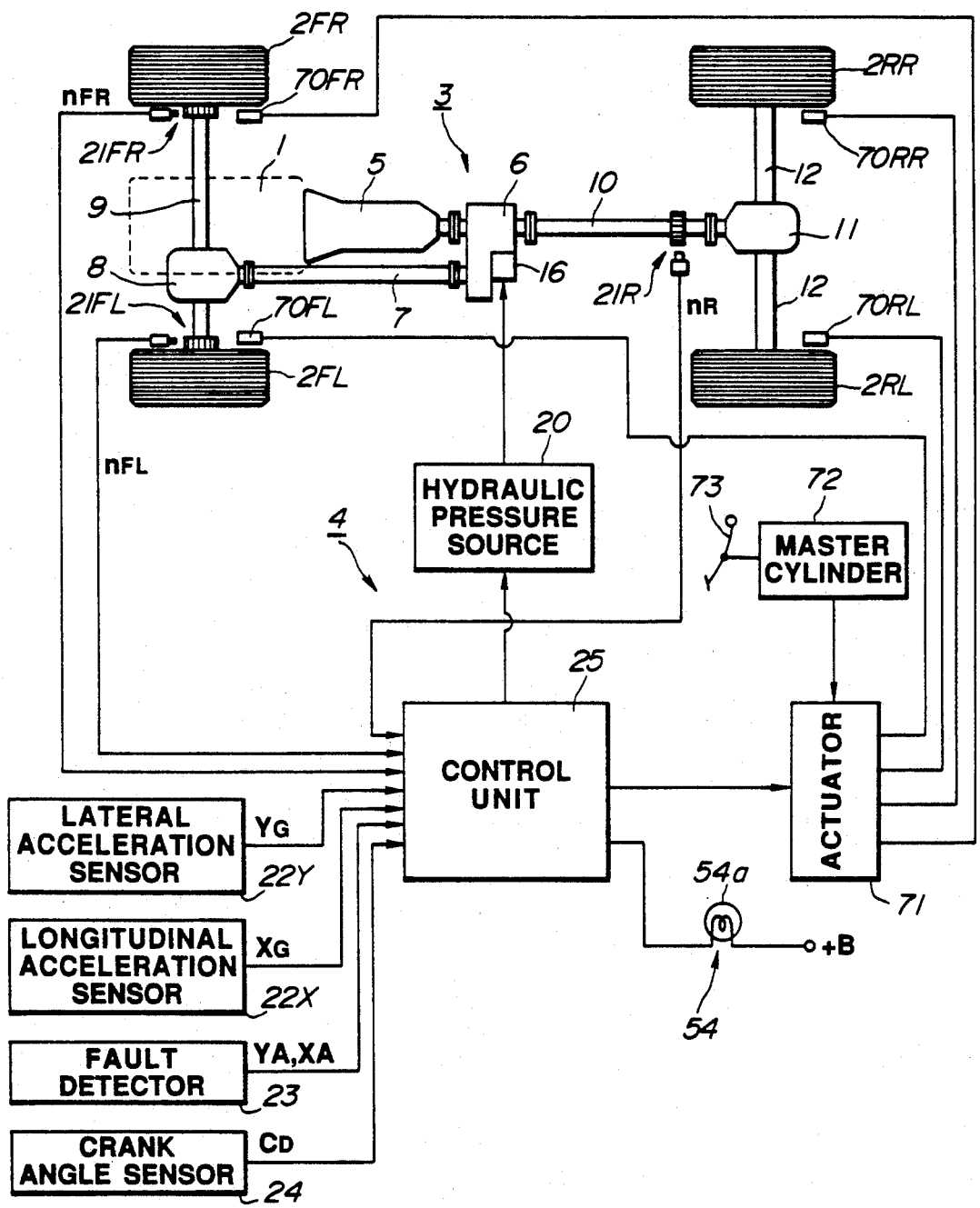
FIG. 1 is a schematic and brief block diagram of the preferred embodiment of an automotive activity control system according to the invention, which employs the preferred embodiment of a fault detecting system of the invention.

Referring now to the drawings, particularly to FIG. 1, the preferred embodiment of an automotive activity control system, according to the present invention, is applied for an automotive vehicle having four-wheel drive power train layout. The vehicle employs an automotive internal combustion engine 1 as a power plant. The vehicle has front-left, front-right, rear-left and rear-right wheels 2FL, 2FR, 2RL and 2RR respectively serving as driving wheels and thus driven by driving torque of the engine 1 via a power train 3. The power train 3 is associated with a power distribution control system 4.

The power train 3 comprises a power transmission 5 for transmitting the engine output torque with a selected gear ratio, a transfer unit 6 for splitting the engine output torque and selectively distributing the engine output torque for selective front-left and front-right wheels 2FL and 2FR and for normally driven rear wheels 2RL and 2RR. The transfer unit 6 has a front side output shaft 7 connected to a front differential gear unit 8 and thus transmits the engine output torque via a front drive axle 9. On the other hand, the transfer unit 6 is connected to the rear wheels 2RL and 2RR via a rear side output shaft as a propeller shaft 10, a rear differential gear unit 11 and rear drive axle 12.

Figure 2:
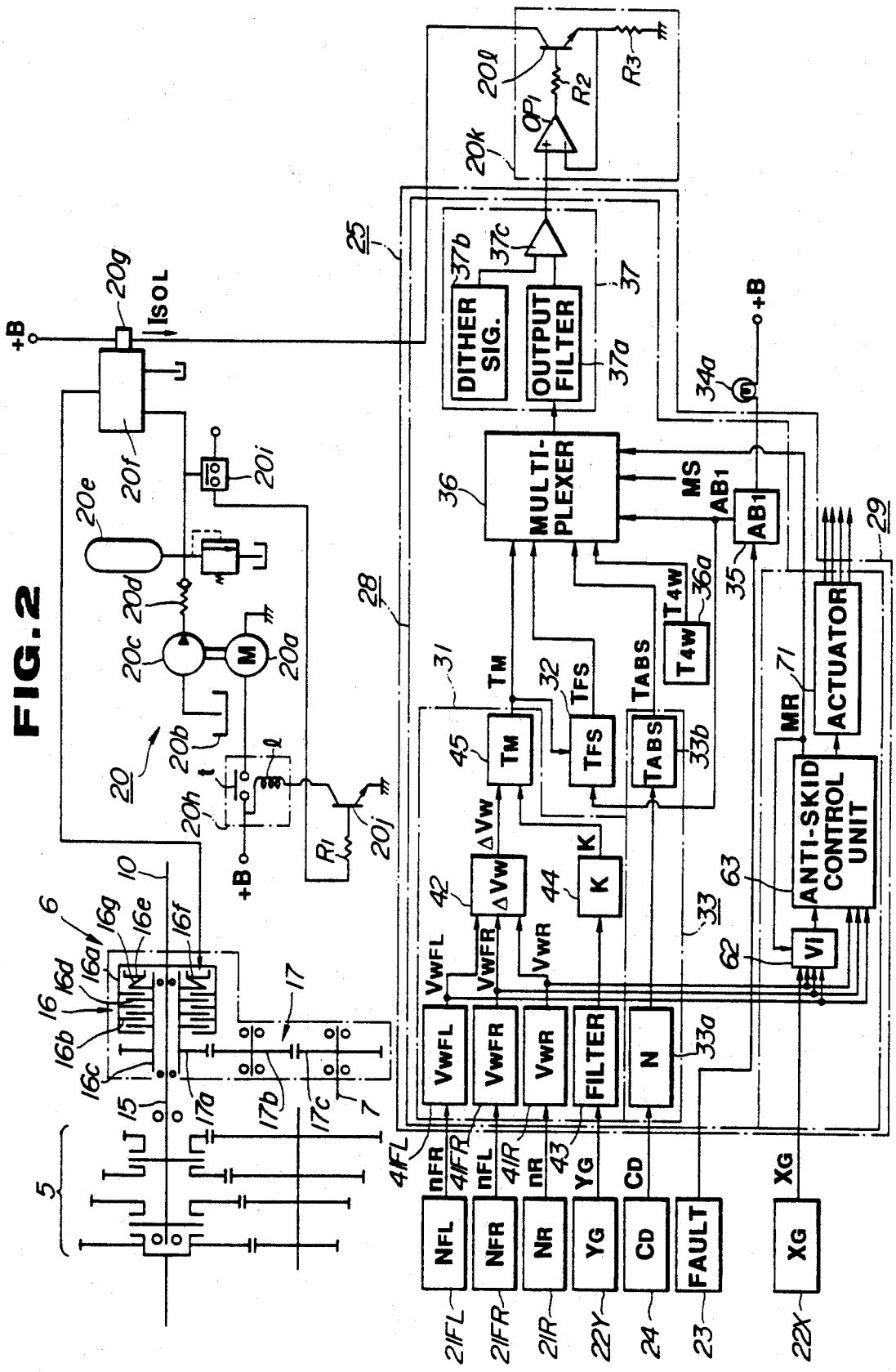
FIG. 2 is a block diagram of the automotive activity control system of FIG. 1.

As briefly shown in FIG. 2, the transfer unit 6 has an input shaft 15 connected to the output shaft of the transmission 5 at one end and to the propeller shaft 10 at the other end. The transfer unit 6 has a wet-type multi-plate clutch assembly 16 which is engaged and disengaged by clutch control pressure Pc supplied from a hydraulic pressure source 20. A gear train 17 is provided between the clutch assembly 16 and the front side output shaft 7 for transmitting part of the driving torque therethrough. The clutch assembly 16 has a clutch drum 16a splined to the input shaft 15 for rotation therewith. A friction plate 16b is integrally coupled with the clutch drum 16a. The clutch assembly 16 also includes a clutch hub 16c rotatable about a needle bearing 17. The clutch hub 16c is rigidly coupled with friction plate 16d. A clutch piston 16e is associated with a cylinder chamber 16f which is defined between the clutch piston and the clutch drum. The clutch piston 16e is normally subject to resilient bias force through a return spring 16g. The gear train 17 has an input gear 17a which is splined with the clutch hub 16c for rotation therewith, an intermediate gear 17b engaged to the input gear 17a and an output gear 17c rigidly coupled with the front side output shaft 7 for drivingly rotate the latter.

While the operating pressure in the cylinder chamber 16f is maintained zero, the friction plate 16d is held away from the friction plate 16b to maintain the clutch in disengaged state. Therefore, all of the driving torque transferred to the input shaft 15 is transferred to the propeller shaft 10 and thus used for driving the rear wheels 2RL and 2RR. Therefore, at this time, the vehicle is driven in a rear-wheel drive mode. On the other hand, by supplying a control pressure into the cylinder chamber 16f, the clutch piston 16e is shifted to the position where balance of the pressure in the cylinder chamber and the return spring 16g is established. By this, the clutch piston 16e drives the friction plate 16d toward the friction plate 16b with a depression force variable depending upon the control pressure supplied to the cylinder chamber 16f. Therefore, magnitude of frictional engagement between the friction plates 16b and 16d is determined by the control pressure supplied to the cylinder chamber 16f. At this condition, part of the driving torque is distributed to the front side output shaft 7 via the gear train 17. Here, the magnitude of driving torque to be distributed to the front wheels which will be hereafter referred to as "front wheel driving torque ΔA", can be derived from:

$$\Delta T = P \times S \times 2n \times \mu \times rm$$

where
P: hydraulic pressure
S: effective area of the clutch piston 16e
n: number of friction plates;
u: friction coefficient of friction plates, and
rm: effective radius of friction plate.

Figure 3:
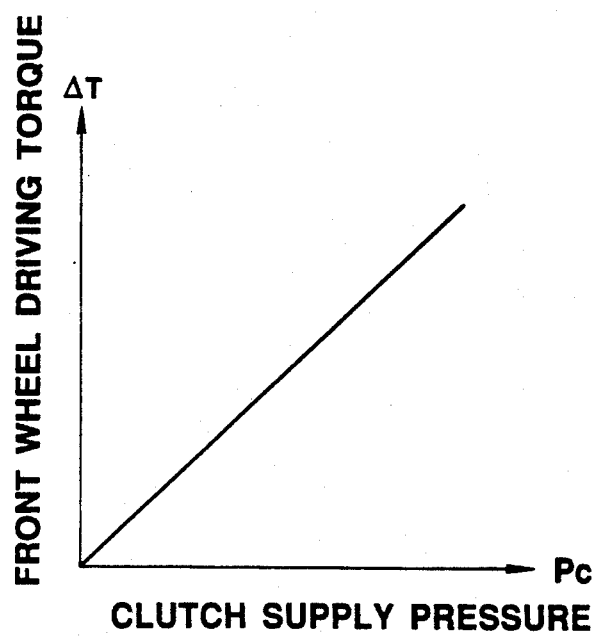
FIG. 3 is a graph showing characteristics of variation of front wheel driving torque in relation to clutch supply pressure.

As shown in FIG. 3, the front wheel driving torque ΔT is proportional to the control pressure Pc. Therefore, torque distribution between front and rear wheels is variable between 0 : 100 to 50 : 50 depending upon the engaging force to be exerted on the clutch assembly 16.

The power distribution control system 4 includes the hydraulic pressure source 20 for supplying the control pressure Pc, front-left, front-right and rear wheel speed sensors 21FL, 21FR and 21R for monitoring rotation speeds of respective of front-left and front-right wheels and average rotation speed of the rear-left and rear-right wheels, a lateral acceleration sensor 22Y and a longitudinal acceleration sensor 22X for monitoring lateral and longitudinal accelerations exerted on the vehicular body, and a crank angle sensor 24 for monitoring crankshaft angular position to produce a crank reference signal and crank position signal. Here, since the crank angle sensor 24 is employed for providing an engine speed representative data either of crank reference signal or crank position signal may be used as "engine speed indicative signal $C_D$ to be used herein. The power distribution control system 4 further includes a fault detector 23 which monitors activities of the lateral and longitudinal acceleration sensors 22Y and 22X for detecting failure of either of the lateral and longitudinal acceleration sensors 22Y and 22X. The power distribution control system 4 further includes a microprocessor-based control unit 25.

Figure 4:
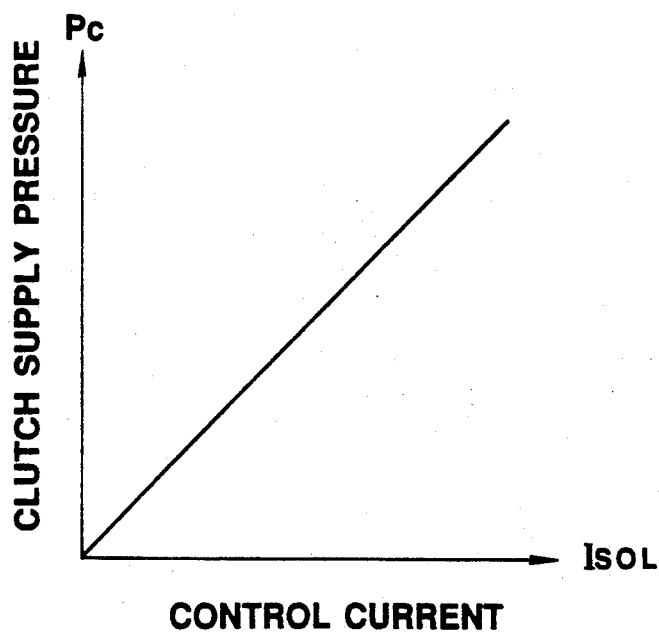
FIG. 4 is a graph showing characteristics of clutch supply pressure in relation to control current.

As shown in FIG. 2, the hydraulic pressure source 20 includes an electric motor 20a associated with an oil pump 20c for pressurizing working oil in a reservoir tank 20b for circulation through the transfer clutch assembly 16. An one-way check valve 20d is provided in a supply line downstream of the oil pump 20c. An accumulator 20e is connected to the supply line at an orientation downstream of the one-way check valve 20d and upstream of the clutch assembly 16. Also, a pressure control valve 20f with a proportioning solenoid 20g is also disposed between the accumulator 20e and the clutch assembly 16. The proportioning solenoid 20g is responsive to a control current $I_{SOL}$ supplied from the control unit 25 for controlling valve position of the pressure control valve 20f and whereby adjusting the control pressure Pc to be supplied to the cylinder chamber 16f. As can be seen from FIG. 4, the control pressure Pc varies in linear fashion proportional to the control current $I_{SOL}$.

The electric motor 20a has an electromagnetic winding connected to a positive power source +B via a motor relay 20h at one end. The other end of the electromagnetic winding of the electric motor 20a is connected to the ground level. The motor relay 20h is controlled, the switch position depending upon the line pressure at the orientation between the accumulator 20e and the pressure control valve, as monitored by means of a pressure switch 20i. In the shown construction, the pressure switch 20i is connected to the base electrode of a switching transistor 20j via a resistor $R_1$. The collector electrode of the transistor 20j is connected to the positive power source +B and the emitter electrode is connected to the ground level. The pressure switch 20i is held OFF while the line pressure in the supply line is higher than a predetermined minimum pressure representative reference value and is turned ON in response to drop below the reference value. In response to turning ON of the pressure switch 20i, the transistor 20j is turned into conductive state to establishing grounding circuit for the relay coil x of the motor relay 20h. Therefore, the relay coil x is energized to close a normally open contactor t of the relay to drive the electric motor 20a. By this, the oil pump 20c is driven to supply the pressurized working fluid to increase the pressure in the accumulator 20e and in the supply line. On the other hand, the proportioning solenoid 20g is connected to the positive power source +B at one end and to a solenoid driver circuit 20k at the other end. The solenoid driver circuit 20k has an operational amplifier $OP_1$ having a non-inverting input connected to the control unit 25 to receive therefrom a pressure control voltage signal Vc. The operational amplifier $OP_1$ has an output connected to the base electrode of a power transistor 20x via a resistor $R_2$. The power transistor 20x has the collector electrode connected to the solenoid 20g and the emitter connected to the ground level.

Figure 5:
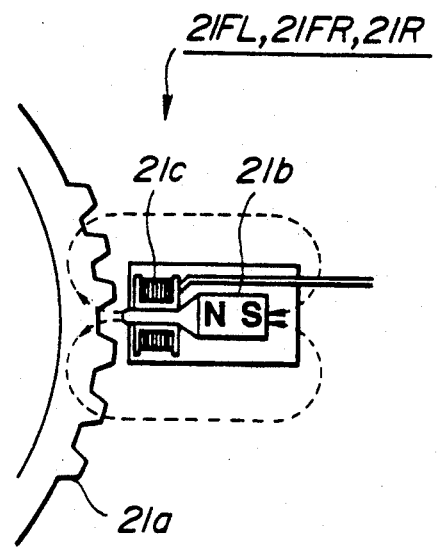
FIG. 5 is a brief and explanatory illustration of a wheel speed sensor to be employed in the automotive activity control system of FIGS. 1 and 2.

As shown in FIG. 5, each of the front-left, front-right and rear wheel speed sensors 21FL, 21FR and 21R comprises a rotor disc 21a with a plurality of circumferentially arranged projections, which rotor disc is rigidly coupled with front-left or front-right drive shaft or with the propeller shaft for rotation therewith, and a magnetic pick-up including a permanent magnet 21b and an induction coil 21c. The magnetic pick-up is so designed as to induce a sinusoidal frequency signal having a frequency proportional to the rotation speed of the rotor disc and thus proportional to the rotation speed of the associated drive shaft or propeller shaft.

The lateral acceleration sensor 22Y is a conventional, well-known sensor and is generally designed for monitoring lateral acceleration exerted on the vehicular body to generate a lateral acceleration indicative signal $Y_G$ to be input to the control unit 25. On the other hand, the longitudinal acceleration sensor 22X, also a conventional, well-known sensor, is generally designed for monitoring the longitudinal acceleration exerted on the vehicular body for producing a longitudinal acceleration indicative signal $X_G$ to be provided for the control unit 25.

Figure 6:
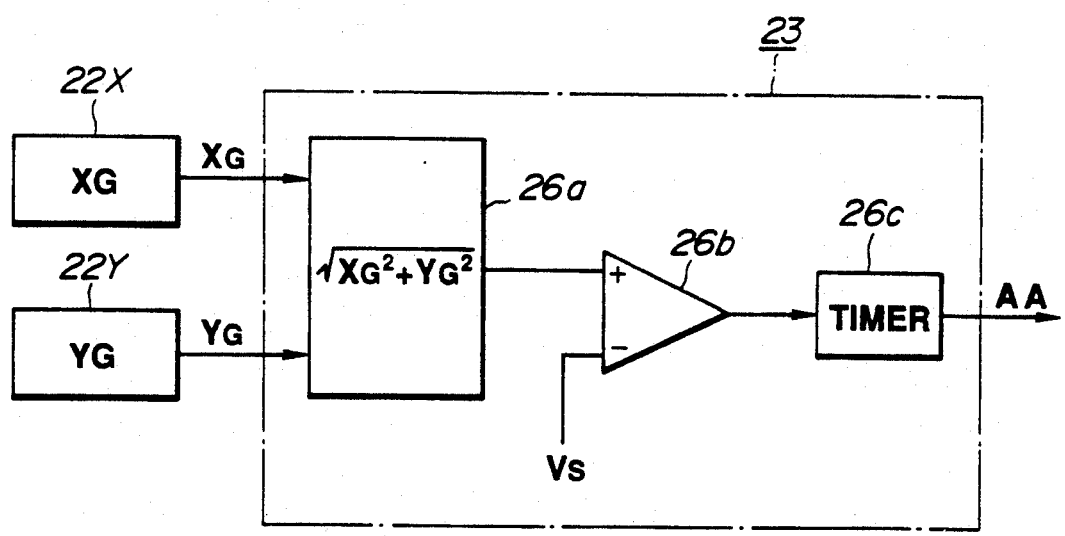
FIG. 6 is a block diagram of a fault detecting circuit in the automotive activity control system.

FIG. 6 shows the circuit construction of the fault detector 23. As seen, the fault detector 23 has an arithmetic circuit 26a which receives the lateral acceleration indicative signal $Y_G$ and the longitudinal acceleration indicative signal $X_G$ from the lateral and longitudinal acceleration sensors 22Y and 22X. The arithmetic circuit 26a performs arithmetic operation for deriving:

$$\sqrt{X_G^2 + Y_G^2}$$

The resultant value of the arithmetic operation is supplied to the non-inverting input terminal of a comparator 26b. The inverting input terminal of the comparator 26b is supplied a pre-set voltage Vs. The comparator 26b is responsive to the input from the arithmetic circuit 26a having the value greater than the pre-set value Vs and outputs HIGH level comparator signal. The output of the comparator 26b is supplied to a timer 26c which is designed to output a fault indicative signal AA when the input from the arithmetic circuit 26a is maintained at a value greater than the pre-set value vs for a predetermined period of time, e.g. 0.5 sec.

In the shown embodiment, the pre-set value Vs is set at a critical acceleration, e.g. 1.2 g, corresponding to road/tire friction coefficient $\mu_{ROAD}$.

The control unit 25 comprises a power distribution control section 28 and an anti-skid brake control section 29.

The power distribution control section 28 has a power distribution deriving circuit 31 for deriving an engaging force $T_M$ of the clutch assembly 16 and thereby deriving power distribution between the front and rear wheels. The power distribution control section 28 also include an engaging force reduction magnitude deriving circuit 32 which derives a magnitude of reduction of the engaging force $T_M$. Also, the power distribution control section 28 has an active anti-skid control responsive power distribution deriving circuit 33 for deriving the engaging force $T_{ABS}$ while the anti-skid brake control is active. A fail-safe circuit 35 is further provided in the power distribution control section 28. The fail-safe circuit 35 is responsive to the fault indicative signal AA from the fault detector 23 and connected to the engaging force reduction magnitude deriving circuit 32 and a multiplexer 36 which multiplexes the engaging force $T_M$ indicative signal of the power distribution deriving circuit 31, the engaging force reducing magnitude $T_{FS}$ indicative signal of the engaging force reduction magnitude deriving circuit 32 and the engaging force $T_{ABS}$ indicative signal of the active anti-skid control responsive power distribution deriving circuit 33. The multiplexer 36 further multiplexes an engaging force $T_{4W}$ indicative signal of a manually entered command responsive power distribution deriving circuit 36a.

The fail-safe circuit 35 feeds fail-safe command for the engaging force reduction magnitude deriving circuit 32 for requiring a predetermined fail-safe mode operation. As well, the fail-safe circuit 35 outputs the fail-safe command for the multiplexer 36 for switching operational mode of the latter to the fail-safe mode. Furthermore, the fail-safe circuit 35 outputs the fault indicative signal to an alarm circuit 34 which includes an alarm lamp 34a.

The multiplexer 36 is connected to a drive signal generator circuit 37 which is, in turn, connected to the solenoid driver circuit 20k for driving the solenoid 20g and whereby controls the control pressure Pc to be supplied to the pressure chamber 16f.

As shown in FIG. 2, the power distribution deriving circuit 31 has wheel speed deriving circuits $41_{FL}$, $41_{FR}$ and $41_R$ which is connected to the front-left, front-right and rear wheel speed sensors 21FL, 21FR and 21R for receiving respective wheel speed indicative signals $N_{FL}$, $N_{FR}$ and $N_R$ for deriving front-left, front-right and rear wheel speed indicative signals $Vw_{FL}$, $Vw_{FR}$ and $Vw_R$. The wheel speed derivation circuit $41_{FL}$, $41_{FR}$ and $41_R$ are connected to a wheel speed difference deriving circuit 42 which derives a wheel speed difference $\Delta Vw$ to produce a wheel speed difference $\Delta Vw$ indicative signal to be fed to an arithmetic circuit 45 of the power distribution deriving circuit 31, which arithmetic circuit 31 actually serves for deriving the engaging force $T_M$. Practically, the wheel speed difference deriving circuit 42 performs arithmetic operation according to the following equation for deriving the wheel speed difference $\Delta Vw$.

$$\Delta Vw = 2Vw_R - Vw_{FL} - Vw_{FR}$$

The power distribution deriving circuit 31 is further provided with a filter means 43 connected to the lateral acceleration sensor 22Y for filtering the lateral acceleration indicative signal $Y_G$ and supplies to a coefficient generator circuit 44. The coefficient generator circuit 44 provides a gain K, which corresponds to an inverse number of the lateral acceleration indicative signal $Y_G$, to the arithmetic circuit 45. The arithmetic circuit 45 performs arithmetic operation for deriving the $T_M$ indicative signal on the basis of the absolute value $|\Delta Vw|$ input from the wheel speed difference deriving circuit 42 and the gain K input from the coefficient generator circuit 44.

Figure 7:
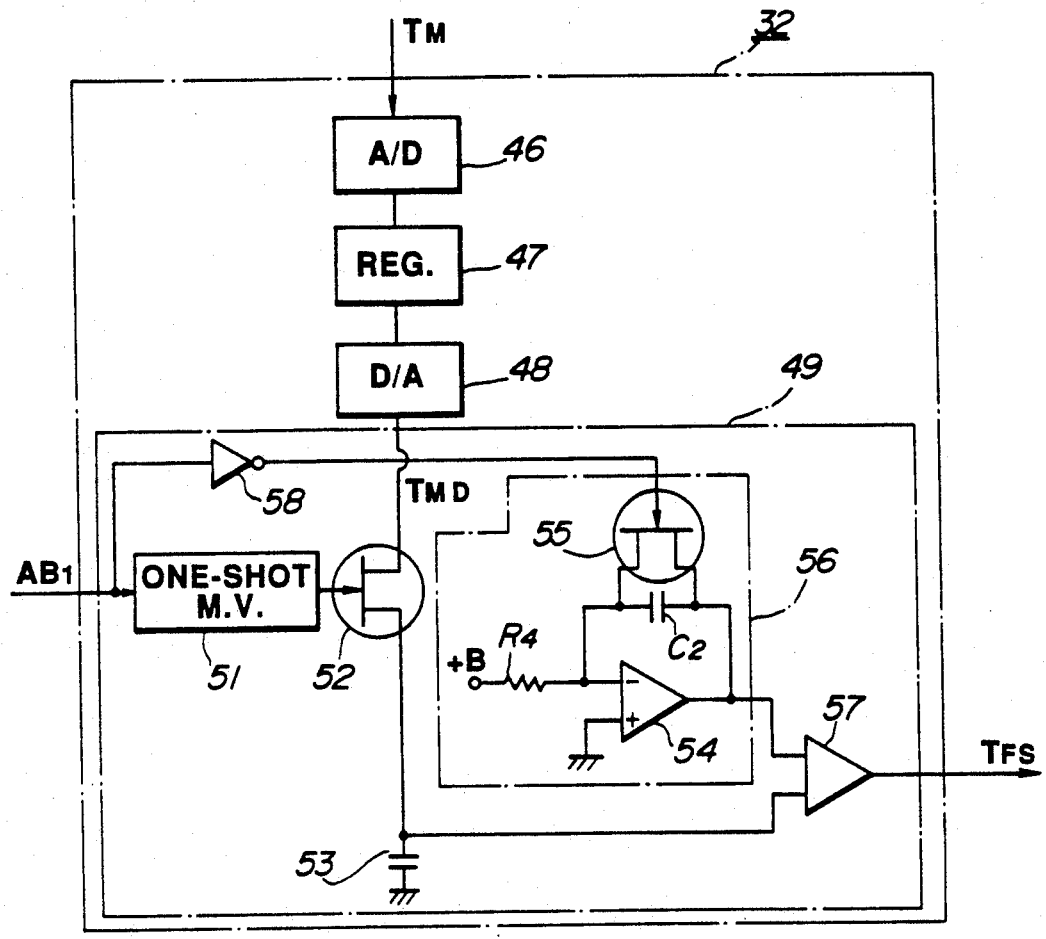
FIG. 7 is a block diagram of engaging force control circuit for controlling power distribution for front and rear wheels.

The engaging force reduction magnitude deriving circuit 32, shown in FIG. 7, includes an analog-to-digital (A/D) converter 46 for converting the analog form $T_M$ indicative signal into digital data representative of the demanded clutch engaging force. The converted $T_M$ indicative digital data is temporarily stored in a shift register 47 in order. The shift register 47 holds the $T_M$ indicative digital data for a predetermined period of time which may correspond to timer period of the timer 26c of the fault detecting circuit 23, and output the corresponding data immediately after expiration of the predetermined period. The output of the shift register 47 is subject to digital-to-analog (D/A) conversion performed by a D/A converter 48 and subsequently supplied to an arithmetic circuit 49. The arithmetic circuit 49 includes a field effect transistor (FET) 52 having drain connected to the D/A converter 48. Gate of the FET 52 is connected to an one-shot multivibrator 51 which is, in turn, connected to the fail-safe circuit 35 to receive therefrom the fault indicative signal $AB_1$. The one-shot multivibrator 51 is responsive to the leading edge of the fault indicative signal $AB_1$ for generating a HIGH level gate input for making the FET 52 at conductive state. The source of the FET 52 is connected to the ground level via a charge capacitor 53.

The engaging force reduction magnitude derivation circuit 32 further includes an integration circuit 56 which has a FET 55 having a gate connected to the fail-safe circuit 35 via an inverter 58. Drain and source of the FET 55 is connected to both sides of a capacitor $C_2$. The integration circuit 56 further includes an operational amplifier 54 having an inverting input connected to a positive power source $+B$ via a resistor $R_4$ and a non-inverting input terminal connected to the ground level. The engaging force reduction magnitude deriving circuit 32 further includes an adder 57 receiving the charge level of the capacitor 53 and the output of the integrator circuit 56 for outputting the $T_{FS}$ indicative signal.

The power distribution deriving circuit 33 includes an engine speed derivation circuit 33a which derives an engine speed indicative value N on the basis of the output signal of the crank angle sensor 24, i.e. crank reference signal or crank position signal. The power distribution deriving circuit 33 further includes an arithmetic circuit 33b which multiplies the engine speed indicative value N by a predetermined constant b for outputting the $T_{ABS}$ indicative signal.

Figure 9:
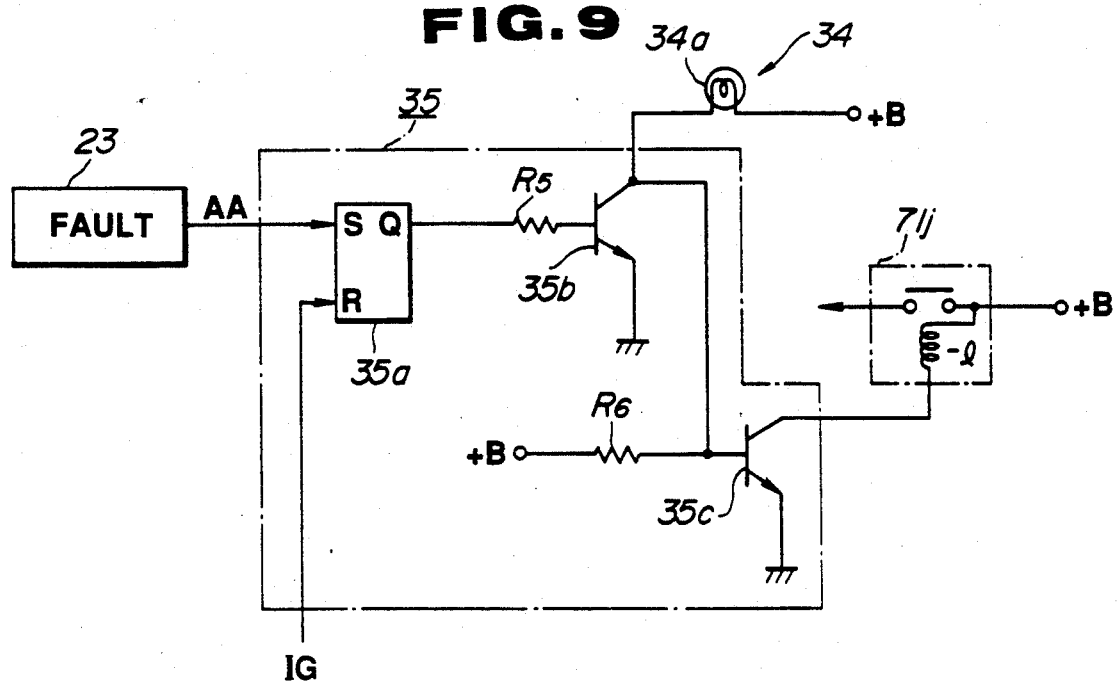
FIG. 9 is a block diagram of a fail-safe circuit employed in the activity control system of FIG. 2.

The fail-safe circuit 35, as shown in FIG. 9, receives the fault indicative signal AA from the fault detecting circuit 23 at a set input of a RS-flipflop 35a. The reset input of the flipflop 35a is connected to an ignition switch (not shown) to be reset in response to the leading edge of the ignition signal. The flipflop 35a has a Q output connected to a base electrode of a switching transistor 35b via a resistor $R_5$. The collector electrode of the switching transistor 35b is connected to the alarm lamp 34a of the alarm circuit 34. On the other hand, the emitter electrode of the switching transistor 35b is connected to a ground level. The collector electrode of the transistor 35b is further connected to the positive power source +B via a resistor $R_6$. The base electrode of the switching transistor 35c is further connected to the positive power source +B via the resistor $R_6$. The collector electrode of the switching transistor 35c is connected to a relay coil x in an actuator relay 71j. which is, in turn connected to the positive power source +B. The actuator relay 71j serves as power supply switch for the anti-skid brake control section 29.

Though not clearly illustrated in FIG. 9, the Q output of the flipflop 35a serves as the fail-safe signal $AB_1$ and supplied to the engaging force reduction magnitude deriving circuit 32 and the analog multiplexer 36.

The multiplexer 36 receives an anti-skid control active state indicative signal which serves as a fluid pump driver signal MR, the fail-safe signal $AB_1$ and a manually entered power train mode selector command MS. When all of these inputs are held LOW level, the multiplexer 36 selects output of the power distribution deriving circuit 31 to output the $T_M$ indicative signal to a drive signal generator circuit 37. On the other hand, if the fail-safe signal $AB_1$ is HIGH level, the multiplexer 36 selects the output of the engaging force reduction magnitude derivation circuit 32 to supply the $T_{FS}$ indicative signal to the drive signal generator circuit 37. When the anti-skid control active state indicative signal MR is HIGH level, the multiplexer 36 output the $T_{ABS}$ indicative signal of the power distribution deriving circuit 33 to the drive signal generator circuit. If the manually entered power train mode selector command MS is held HIGH level, the $T_{4W}$ indicative signal of the power distribution deriving circuit 36a is applied to the drive signal generator circuit 37.

The drive signal generator circuit 37 includes an output filter 37a for filtering the input signal from the multiplexer 36 and feeding to an adder 37c. The adder 37c is also connected to a dither signal generator 37b to receive therefrom a dither output to add to the output from the multiplexer 36. The adder 37c thus outputs a driver signal to the operational amplifier $OP_1$ of the solenoid drive circuit 20K.

As shown in FIG. 2, the anti-skid brake control section 29 receives the longitudinal acceleration indicative signal $X_G$ from the longitudinal acceleration sensor 22X. Also, the anti-skid brake control section 29 receives the front-left, front-right and rear wheel speed indicative signals $Vw_{FL}$, $Vw_{FR}$ and $Vw_R$ from the front-left, front-right and rear wheel speed deriving circuits 41FL, 41FR and 41R. The anti-skid brake control system includes a vehicle speed representative value Vi projecting circuit 62 and an anti-skid control unit 63 which controls actuator or pressure control valve unit 71 for adjusting fluid pressure bluit-up in front-left, front-right, rear-left and rear-right wheel cylinders 70FL, 70FR, 70RL and 70RR. It should be noted that though FIG. 2 shows only one pressure control valve unit 71 for uniform and mutually dependent skid control for all wheel cylinders, it is possible to provide the actuators for respective wheel cylinders in order to facilitate independent skid control operation per each wheel.

Figure 10:
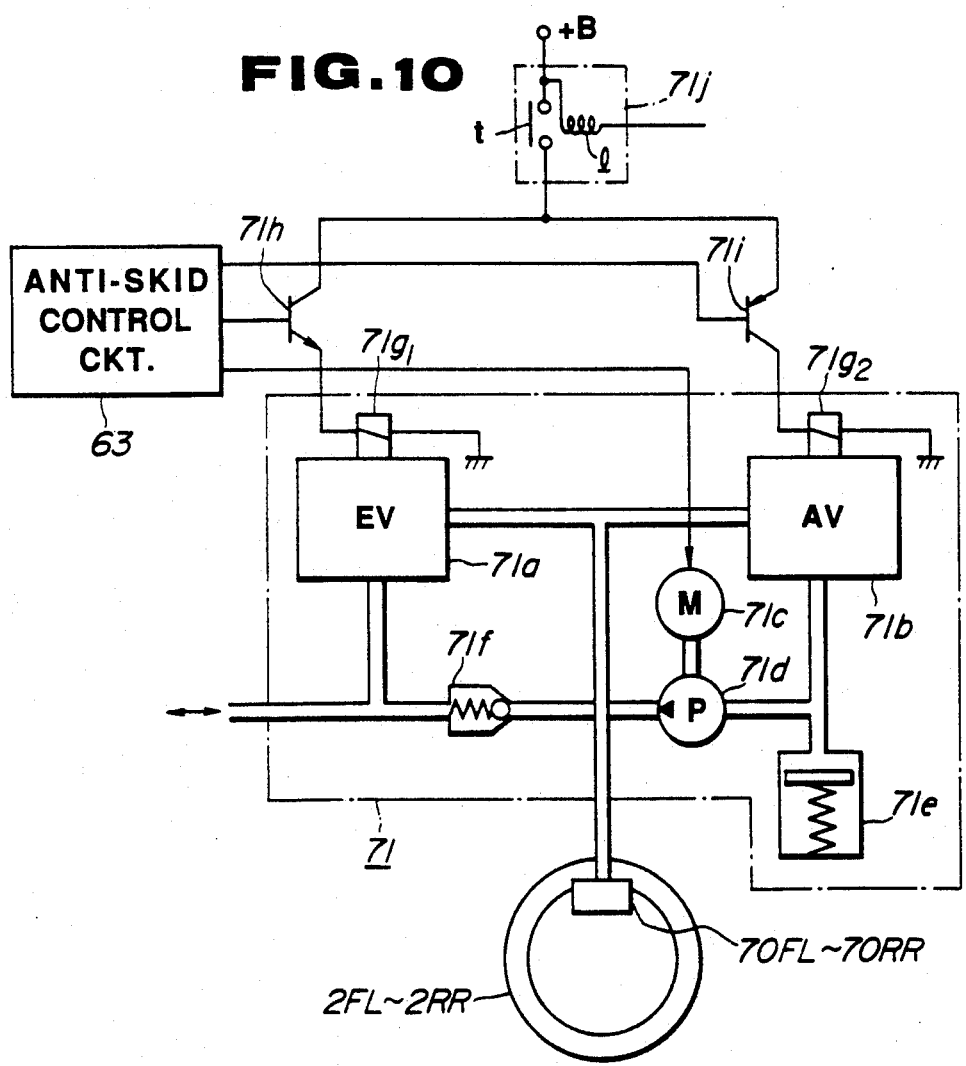
FIG. 10 is a block diagram of anti-skid brake control network employed in the automotive activity control system of FIG. 2.

FIG. 10 shows one example of the pressure control valve unit 71 which may be employed in the shown anti-skid brake control. As can be seen from FIG. 10, the pressure control valve unit 71 includes an inlet control (Ev) valve 71a and an outlet control (AV) valve 71b. The pressure control valve unit 71 also includes a drain pump 71d driven by means of an electric motor 71c which is controlled by MR signal from the anti-skid control unit 63. The pressure control valve unit 71 has an inlet port connected to the master cylinder 72 to receive the working fluid pressure built up in the latter and an outlet port connected the wheel cylinder 70. The EV valve 71a is interposed between the inlet port and the outlet port for controlling introduction of the pressurized working fluid to the wheel cylinder 70. The AV valve 71b is connected to the outlet of the EV valve 71a, the outlet port at the inlet side and to the pressure accumulator 71e and the drain pump 71d. The discharge outlet drain pump 71d is connected to the inlet port via a one-way check valve 71f for returning part of working fluid in the pressure control valve unit 71 to the fluid reservoir (not shown) and designed for supplying pressurized working fluid.

The EV valve 71a includes an electromagnetic actuator 71g, such as solenoid. The electromagnetic actuator 71g$_1$ is connected to the emitter electrode of a power transistor 71h, which comprises PNP transistor and has the base electrode connected to the anti-skid control unit 63. The collector electrode of the power transistor 71h is connected to the positive power source +B via a relay switch 71j. The relay switch 71j has a normally open contact as long as no fault in the acceleration sensors is detected, the relay coil x is held energized for open normally closed contact for establishing electrical connection between the positive power source +B and the collector electrode of the power transistor 71h. Similarly, the AV valve 71b includes an electromagnetic actuator 71g$_2$, such as solenoid. The electromagnetic actuator 71g$_2$ is connected to the collector electrode of a power transistor 71i which comprises NPN type transistor and has a base electrode connected to the anti-skid control unit 63. On the other hand, the emitter electrode of the power transistor 71i is connected to the positive power source +B via the switching relay 71j electrode of a power transistor.

With the construction set forth above, the pressure control valve unit 71 essentially operates in three mutually different operational modes. Namely, the pressure control valve unit 71 operates in an APPLICATION mode for increasing braking pressure in the wheel cylinder 70, a RELEASE mode for decreasing braking pressure in the wheel cylinder, and a HOLD mode to maintain the braking pressure constant. In the APPLICATION mode position, the EV valve 71a is maintained in open position to establish fluid communication between the master cylinder 72 and the wheel cylinder 70 and the AV valve 71b is maintained closed position for blocking fluid communication between the wheel cylinder 70 and the pressure accumulator 71e. At the same time, the drain pump 71d may be held inoperative state.

In the RELEASE mode position of the pressure control valve unit 71, the EV valve 71a is held closed to block fluid communication between the inlet port to the outlet port and thereby blocking pressure supply from the master cylinder 8 to the wheel cylinder 70. At the same time, the AV valve 71b is maintained at open position to establish fluid communication between the outlet port, and the pressure accumulator 71e and the drain pump 71d so that the pressurized fluid in the wheel cylinder 70 can be drained to the pressure accumulator 71e or to the fluid reservoir via the drain pump 71d and the one-way check valve 71f. In order to drain in part of the working fluid from the wheel cylinder to the fluid reservoir, the drain pump 71d is driven in this RELEASE mode. On the other hand, in the HOLD mode position, both of the Ev valve 71a and the AV valve 71b are held closed for completely disconnecting the wheel cylinder 70 from the inlet port and the pressure accumulator 71e.

The EV valve 71a is held open position in response to LOW level EV signal and shifted to closed position in response to the HIGH level EV signal. On the other hand, the AV valve 71b is maintained at closed position as long as the AV signal is held LOW level and is opened by the HIGH level AV signal. The drain pump 71d is driven by the HIGH level MR signal.

The pressure control valve unit 71 is operated in the aforementioned three mode positions over skid control cycles. In general, skid control cycle is scheduled as follows:

1) the pressure control valve unit 71 is maintained at the APPLICATION mode position upon initiation of the braking operation which is triggered by depression of the brake pedal 73, 2) by application of the braking force to the brake pedal, working fluid pressure is built up in the master cylinder 72, since the pressure control valve unit 71 is held at the APPLICATION mode position, the braking pressure in the wheel cylinder 70 is increased linearly in proportion to increasing of the working fluid pressure to decelerate the wheel speed;

3) by increasing of the braking pressure, wheel deceleration $-\alpha$ (negative value of wheel acceleration) increases and becomes greater than a predetermined deceleration threshold $-\alpha_2$, the anti-skid control unit 63 is responsive to the wheel deceleration increased across the deceleration threshold to initiate skid control cycle, upon which the skid control cycle enters into HOLD mode cycle period to place the pressure control valve unit 71 at the HOLD mode position to maintain the increased level of braking pressure constant;

4) by holding the increase level of braking pressure in the HOLD mode position of the pressure control valve unit 71, wheel is decelerated to increase wheel slippage across a predetermined wheel slippage threshold, the anti-skid control unit 63 is responsive to increasing of the wheel slippage increasing across the wheel slippage threshold to terminate the HOLD mode cycle period and trigger RELEASE mode cycle period, in which the pressure control valve unit 71 is placed in the RELEASE mode position to decrease braking pressure in the wheel cylinder 70;

5) by maintaining the pressure control valve unit 71 in the RELEASE mode position, braking pressure is reduced and thus wheel is accelerated to result in increasing of wheel acceleration $+\alpha$ across a predetermined wheel acceleration threshold $+\alpha_1$, the anti-skid control unit 63 is responsive to increasing of the wheel acceleration $+\alpha$ across the wheel acceleration threshold $+\alpha_1$ to terminate the RELEASE mode cycle period and trigger a HOLD mode cycle period to switch the position of the pressure control valve unit 71 from the RELEASE mode position to the HOLD mode position in order to hold the braking pressure at the lowered level;

6) by maintaining the pressure control valve unit 71 at the HOLD mode, wheel speed is resumed and increased across the vehicle body speed and subsequently return to the speed corresponding to the vehicle body speed, the anti-skid control unit 63 is responsive to the wheel speed once increased across the vehicle body speed and subsequently return to the vehicle body speed to terminate HOLD mode cycle period and trigger APPLICATION mode cycle period;

The skid cycles 3) to 6) are repeated while anti-skid control is active.

The shown embodiment of the anti-skid brake control system is triggered in response to turning ON of the ignition switch to initiate power supply. Then, wheel speed sensors 3 start monitoring rotation speed of respectively corresponding wheels 15. The wheel speed sensors 3 thus continuously produce the wheel speed indicative signals $v_w$. The alternating current form wheel speed indicative signals $v_w$, are cyclically or periodically converted into digital wheel speed indicative data Vw by the A/D converter in the input interface to be processed in the anti-skid control unit 63.

Figure 11:
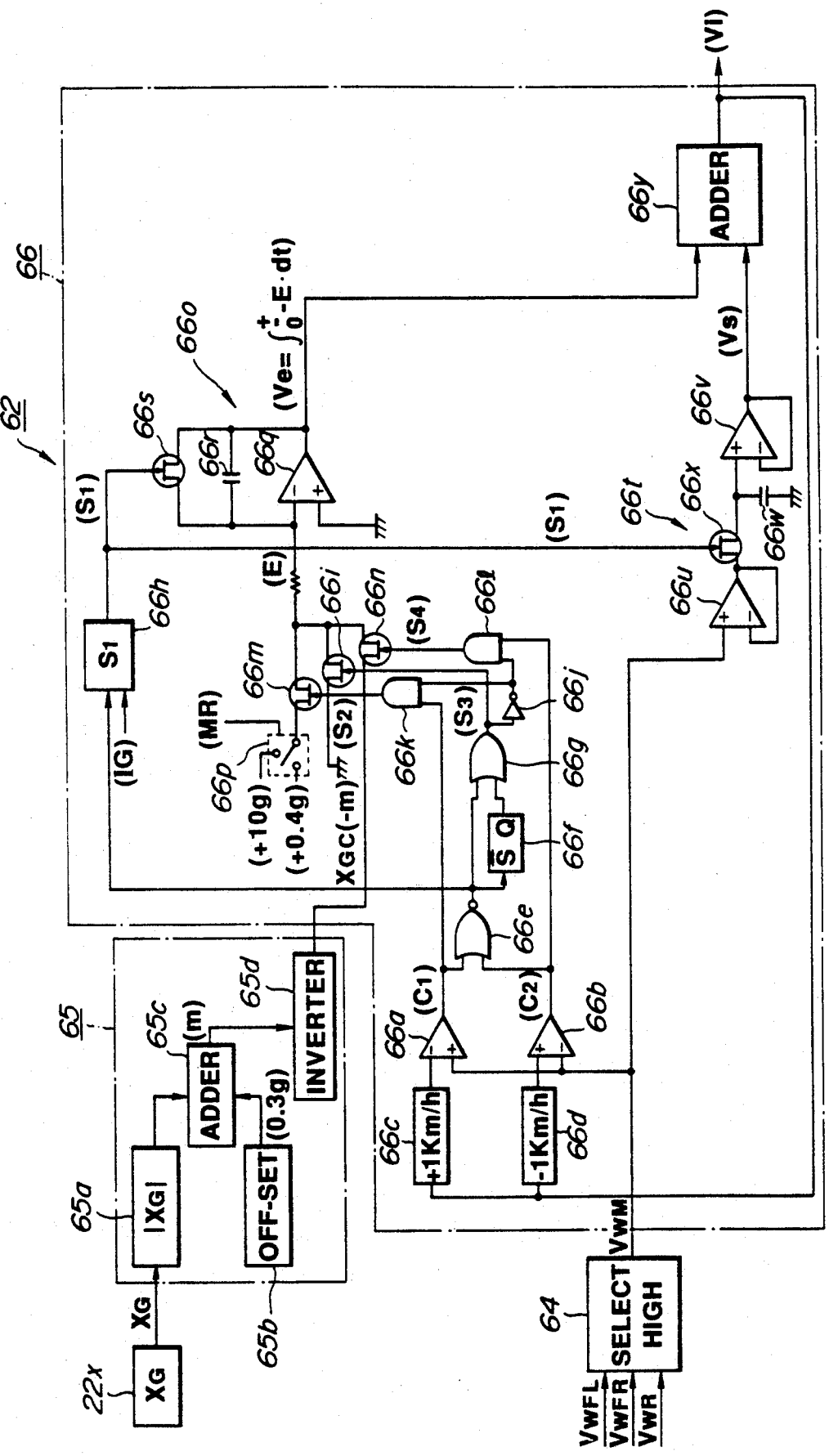
FIG. 11 is a block diagram of a vehicle speed representative data projecting circuit employed in the automotive activity control system of FIG. 2.

FIG. 11 shows the detailed construction of the vehicle speed representing value projecting circuit 62. As set forth above, the vehicle speed representing value projecting circuit 62 derives a vehicle speed representing value Vi based on the wheel speeds $Vw_{FL}$, $Vw_{FR}$ and $Vw_R$ as indicated in the wheel speed indicative signals from the wheel speed derivation circuit 41FL, 41FR and 41R. The vehicle speed representing value projecting circuit 62 includes comparators 66a and 66b. The comparator 66a has a non-inverting input terminal connected to the wheel speed derivation circuits 41FL, 41FR and 41R via a select HIGH circuit 64. On the other hand, the comparator 66b is connected to the wheel speed derivation circuits 41FL, 41FR and 41R at an inverting input terminal. An inverting input terminal of the comparator 66a is connected to output terminal of the vehicle speed representing value projecting circuit 62 through which the vehicle speed representing value Vi is output, through an adder 66c. On the other hand, the non-inverting input terminal of the comparator 66b is connected to the output terminal of the vehicle speed representing value projecting circuit 62 through a subtractor 66d. The adder 66c is designed to add a given value corresponding to 1 km/h of vehicle speed to the vehicle speed representing value Vi for providing dead band of +1 km/h. The value as the sum of the vehicle speed representing value Vi and the dead band value 1 km/h will be hereafter referred to as "higher vehicle speed reference value". Similarly, the subtractor 66d subtracts a given value corresponding to 1 km/h of the vehicle speed from the vehicle speed representing value Vi for providing dead band of $-1$ km/h. The value as the difference of the vehicle speed representing value vi and the dead band value $-1$ km/h will be hereafter referred to as "lower vehicle speed reference value. The comparator 66a outputs HIGH level comparator signal when the wheel speed $Vw_{FL}$, $Vw_{FR}$ or $Vw_R$ is higher than or equal to the higher vehicle speed reference value ($Vi_1 + 1$ km/h). In other words, the comparator signal level of the comparator 66a is held LOW as long as the wheel speed $Vw_{FL}$, $Vw_{FR}$ or $Vw_R$ is maintained lower than the lower vehicle speed reference value ($Vi + 1$ km/h). The comparator 66b outputs HIGH level comparator signal when the wheel speed $Vw_{FL}$, $Vw_{FR}$ or $Vw_R$ is lower than to the lower vehicle speed reference value ($Vi - 1$ km/h). In other words, the comparator signal level of the comparator 66a is held LOW as long as the wheel speed $Vw_{FL}$, $Vw_{FR}$ or $Vw_R$ is maintained higher than or equal to the lower vehicle speed reference value ($Vi - 1$ km/h).

The output terminals of the comparators 66a and 66b are connected to input terminals of NOR gate 66e to feed the comparator signals $C_1$ and $C_2$ thereto. The NOR gate 66e outputs HIGH level gate signal while signal levels of both of the comparator signals $C_1$ and $C_2$ are maintained LOW. Namely, the gate signal output from the NOR gate 66e is held LOW while the select HIGH input of the wheel speed $Vw_{FL}$, $Vw_{FR}$ or $Vw_R$ is maintained higher than or equal to the vehicle speed representing value $Vi - 1$ km/h and lower than the higher vehicle speed reference value ($Vi + 1$ km/h). The gate signal of the NOR gate 66e is fed to a timer 66f, an OR gate 66g and a shot-pulse generator 66h, respectively. The timer 66f is responsive to the trailing edge of the HIGH level NOR gate signal to output a timer signal for a given period of time, e.g. 0.1 sec. The timer signal is fed to the OR gate 66g.

The OR gate 66g thus receives the NOR gate signal at one input terminal and the timer signal from the timer 66f at the other input terminal. An OR gate signal of the OR gate 66f is transmitted to a gate of an analog switch 66i as a selector signal $S_3$. The output terminal of the OR gate 66g is also connected to one input terminal of an AND gates 66k and 66x via an inverter 66j. The other input terminal of the AND gate 66k is connected to the output terminal of the comparator 66a to receive therefrom the comparator signal $C_1$. Similarly, the other input terminal of the AND gate 66x is connected to the output terminal of the comparator 66b to receive the comparator signal $C_2$ therefrom. Therefore, the gate signal $S_2$ of the AND gate 66k becomes HIGH while the comparator signal $C_1$ is maintained at HIGH level and the NOR gate signal is held LOW. The gate signal $S_2$ serves as a selector signal. On the other hand, the gate signal $S_4$ of the AND gate 66x becomes HIGH level while the comparator signal $C_2$ is maintained HIGH and the NOR gate signal is held LOW. This gate signal $S_4$ also serves as selector signal. The AND gates 66k and 66x are connected to gates of analog switches 66m and 66n.

The analog switch 66i is turned ON in response to HIGH level selector signal $S_3$ to drop the supply voltage to an integrator circuit 66o to zero. On the other hand, the analog switch 66k is turned ON in response to the HIGH level selector signal $S_2$ to supply a voltage E corresponding to a possible maximum wheel acceleration, e.g. 0.4 G, to the integrator circuit 66o. The analog switch 66n is connected to a correction circuit 65 which is designed for correcting the longitudinal acceleration indicative signal value $X_G$ for deriving a minimum wheel acceleration representative value $X_{GC(-m)}$. The analog switch 66n is likewise turned ON in response to the HIGH level selector signal $S_4$ to supply a voltage corresponding to possible minimum wheel acceleration value to the integrator circuit 66o.

The correction circuit 65 includes an absolute value circuit 65a connected to the longitudinal acceleration sensor 22X to receive therefrom the longitudinal acceleration indicative signal $X_G$ and output absolute value signal representative of the absolute value $|X_G|$ of the longitudinal acceleration indicative signal. The absolute value signal of the absolute value circuit 65a is input to an adder 65c. The adder 65c also receives an offset value from an offset value generator circuit 65b. The adder output is supplied to the analog switch 66n via an inverter 65d as the minimum wheel acceleration representative value $X_{GC(-m)}$.

The integrator circuit 66o has a per se well known construction and is comprised of an amplifier 66q, a capacitor 66r and an analog switch 66s. The gate of the analog switch 66s is connected to the shot-pulse generator 66h to receive therefrom a shot-pulse which serves as a reset signal $S_1$. The integrator 66o is reset by the HIGH level reset signal $S_1$ and is responsive to the trailing edge of the HIGH level reset signal to reset the integrated value. The integrator circuit 66o integrates the supply voltage E after termination of the HIGH level reset signal $S_1$ to output the integrator signal. The shot-pulse generator 66h is responsive to an ON-set signal IG of an ignition switch to generate a first shot pulse as the first reset signal for resetting the integrator circuit 66o. The shot-pulse generator 66h subsequently generate the shot-pulses serving as the reset signal $S_1$ at every leading edge of the HIGH level NOR gate signal. As set forth above, since the NOR gate signal becomes HIGH when the select HIGH input of the wheel speeds $Vw_{FL}$, $Vw_{FR}$ and $Vw_R$ satisfies $(Vi - 1 \text{ km/h}) < = V\text{-}w < (Vi + 1 \text{ km/h})$, the integrated value of the integrator 66o is reset every occurrence of the wheel speed Vw in the aforementioned range. The reset signal $S_1$ of the shot-pulse generator 66h is also supplied to a sample hold circuit 66t. The sample hold circuit 66t comprises a buffer amplifiers 66u and 66v, a capacitor 66w and an analog switch 66x. The analog switch 66x is connected to the shot-pulse generator 66h to receive the reset signal $S_1$ at the gate thereof to be turned ON. The sample hold circuit 66t is responsive to turning ON of the analog switch 66x to reset the held wheel speed value. The sample hold circuit 66t in absence of the reset signal $S_1$ from the shot-pulse generator 66h, samples and holds the instantaneous wheel speed value Vw at the occurrence of the reset signal as a sample value Vs. The sample hold circuit 66t outputs a sample/hold signal having a value indicative of the sample value Vs to an adder 66y. The adder 66y receives the sample/hold signal from the sample hold circuit 66t and integrator signal from the integrator 66o. As will be appreciated, the integrator signal has a value indicative of an integrated value $$Ve\left(=\int_0^t (-E)\cdot dt\right).$$

Therefore, the adder 66y addes the integrated value Ve to the sample value Vs to derive the vehicle speed representing value Vi. The output terminal of the adder 66y is connected to the anti-skid control unit 63.

Figure 12:
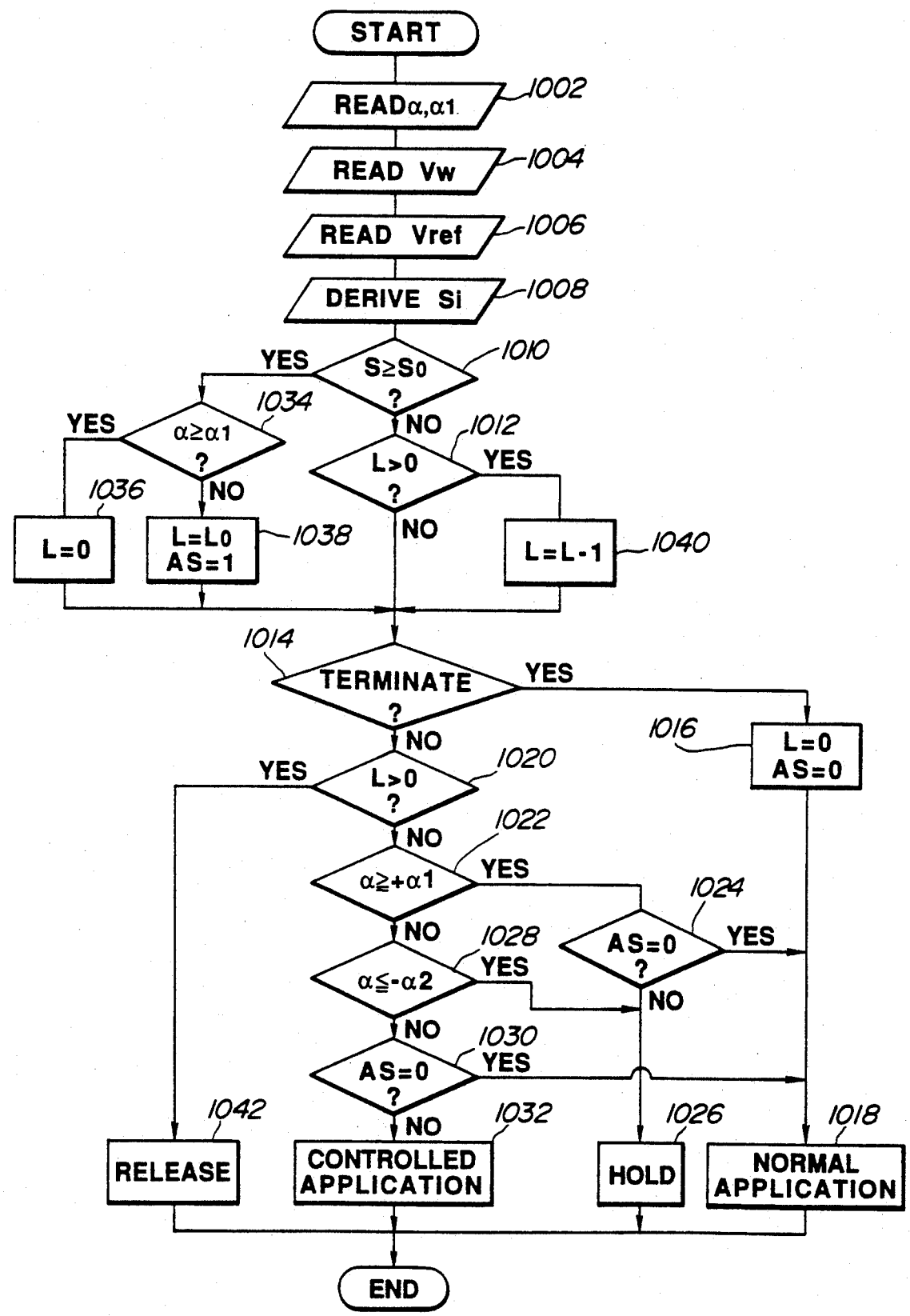
FIG. 12 is a flowchart showing process of anti-skid brake control to be performed by the preferred embodiment of the automotive activity control system of FIG. 2.
Figure 13:
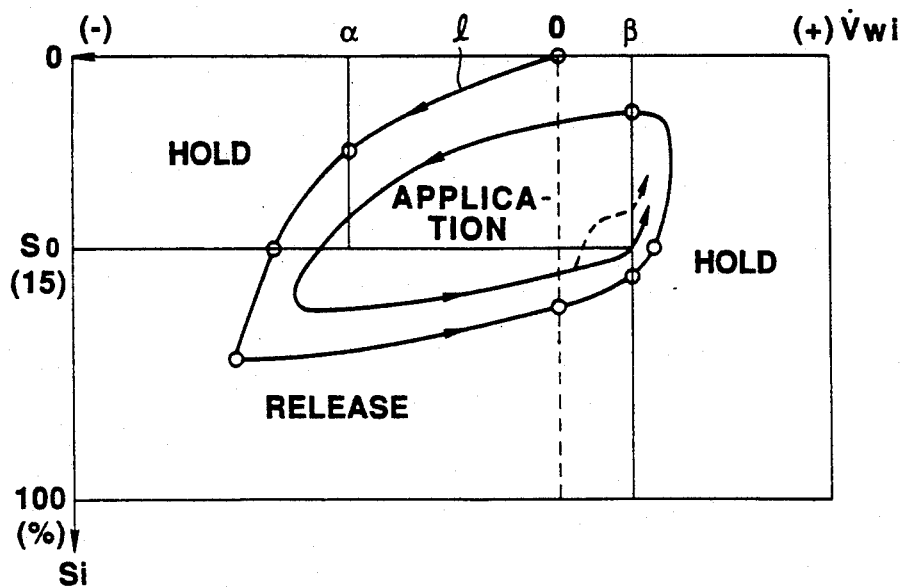
FIG. 13 is a diagram showing process of anti-skid operation to be performed by the preferred embodiment of the automotive activity control system.

FIG. 12 shows a skid cycle control routine for controlling the skid control cycle generally according to the schedule set forth in the general discussion of the process of anti-skid brake control.

Immediately after starting execution, the selected average wheel acceleration indicative data $\alpha$ and the selected wheel deceleration threshold $-\alpha_2$ are read out at a step 1002. At a step 1004, the wheel speed indicative data Vw is read out. At a step 1006, the vehicle body speed representative data $V_{ref}$ is read out. At a step 1008, the wheel slippage Si is derived according to the following equation:

$$Si=\{(V_{ref}-Vw)/V_{ref}\}\times 100\ (\%)$$

The wheel slippage Si is compared with a predetermined wheel slippage threshold $S_O$ at a step 1010. The wheel slippage threshold $S_O$ may be set at about the optimum wheel slippage range where an optimum vehicle braking efficiency can be obtained. In the shown embodiment, the wheel slippage threshold $S_O$ is set at 15%.

The shown embodiment performs APPLICATION mode operation in mutually different two way modes. The braking pressure increases linearly according to increasing of the fluid pressure built up in the master cylinder 72. Such operational mode will be hereafter referred to as "NORMAL APPLICATION mode". The pressure control valve is operated alternatively to the APPLICATION mode position and HOLD mode position for increasing the braking pressure in stepwise fashion. This operation mode will be hereafter referred to as "CONTROLLED APPLICATION mode". The CONTROLLED APPLICATION mode is introduced in order to lower increasing speed of the braking pressure in the wheel cylinder so that the braking pressure is held at a level close to a pressure where the optimum wheel slippage is obtained and hereafter referred to as "lock pressure", for an expanded period.

At the initial stage of the braking operation, wheel slippage Si is held smaller than that wheel slippage threshold $S_O$. Therefore, the answer at the step 1010 at the initial braking state becomes negative. Then, at a step 1012, check is performed whether a RELEASE mode timer value L of a RELEASE mode timer (not shown but facilitated in the arithmetic circuit 12c of the microprocessor) is greater than zero or not. At this time, the RELEASE mode timer value L is maintained at zero, the answer at the step 1012 also becomes negative. Then, at a step 1014, judgement is made that the condition satisfies a predetermined skid control terminating condition.

In the practical embodiment, the skid control terminating conditions are set as follows:
when the vehicle body speed indicative data $V_{ref}$ is smaller than or equal to a vehicle body stopping state indicative reference value $V_{ref0}$;
when number of occurrence of switching of the pressure control valve mode position in the CONTROLLED APPLICATION mode becomes greater than or equal to a predetermined value $N_O$; and
when the brake switch is turned OFF.

When the skid control terminating condition is satisfied as checked at the step 1014, the RELEASE mode timer value L is cleared and a skid control state indicative period flag AS is reset at a step 1016. At a step 1018, the NORMAL APPLICATION mode skid control cycle period is commanded. Thereafter, process goes END.

If the skid control terminating condition as checked at the step 1014 is not satisfied, the RELEASE mode timer value L is again checked at a step 1020. When the RELEASE mode timer value L is smaller than or equal to zero as checked at the step 1020, the wheel acceleration $\alpha$ is compared with a predetermined acceleration threshold $+\alpha_1$, at a step 1022. If the acceleration as checked at the step 1022 is greater than or equal to the wheel acceleration threshold $+\alpha_1$, it means that the wheel is not yet decelerated after initiation of increasing of the braking pressure or wheel is acceleration during RELEASE mode cycle period. Therefore, in order to discriminate the instantaneous status of the braking condition, check is performed whether the skid control state indicative flag AS is set at a step 1024. When the skid control state indicative flag AS is not set as checked at a step 1024, then process goes to the process through the step 1018 for setting the operation mode to the NORMAL APPLICATION mode.

On the other hand, when the skid control state indicative flag AS is set as checked at the step 1024, then judgement is made to switch the skid control cycle from the RELEASE mode cycle period to the HOLD mode cycle period because the wheel acceleration $\alpha$ is held greater than the wheel acceleration threshold $+\alpha_1$ and the operational mode is held in the RELEASE mode. Then, HOLD mode cycle period is commanded at a step 1026. After commanding the HOLD mode cycle period, the process goes END.

On the other hand, when the wheel acceleration $\alpha$ as compared with the wheel acceleration threshold $+\alpha_1$ at the step 1022, is smaller than the acceleration threshold $+\alpha_1$, then the wheel acceleration $\alpha$ is checked with a predetermined wheel deceleration threshold $-\alpha_2$ at a step 1028. When the wheel acceleration u as checked at the step 1028 is smaller than the wheel deceleration threshold $-\alpha_2$, it means that the braking condition requires anti-skid control Then, at the step 1026, the HOLD mode cycle period is commanded for placing the pressure control valve 16 at the HOLD mode position, at a step 1026.

If the wheel acceleration $\alpha$ as compared with the wheel deceleration threshold $-\alpha_2$ at the step 1028 is greater than the wheel deceleration threshold, the skid control state indicative flag AS is checked at a step 1030. If the skid control mode indicative flag AS is not set as checked at the step 1030, process goes to the step 1018. On the other hand, when the skid control state indicative flag AS is not set as checked at the step 1030, the CONTROLLED APPLICATION mode cycle period is commanded at a step 1032.

On the other hand, when wheel slippage Si as checked at the step 1010 is greater than or equal to the wheel slippage threshold $S_O$, then the wheel acceleration $\alpha$ is compared with the wheel acceleration threshold $+\alpha_1$ at a step 1034. When the wheel acceleration $\alpha$ as checked at the step 1030 is greater than or equal to the wheel acceleration threshold $+\alpha_1$, judgement can be made that the condition is not satisfied to perform the RELEASE mode skid control cycle period operation. Therefore, the RELEASE mode timer value L is cleared at a step 1036. On the other hand, when the wheel acceleration α as checked at the step 1034 is smaller than the wheel acceleration threshold $+\alpha_1$, judgement can be made that a condition for performing the RELEASE mode skid control mode cycle period is satisfied. Therefore, at a step 1038, the RELEASE mode timer value L is set at a predetermined initial timer value $L_O$ which represents a period to maintain RELEASE mode skid control cycle period after the wheel slippage Si is decreased across the wheel slippage threshold $S_O$. At the same time, the skid control state indicative flag AS.

When the RELEASE mode timer value L as checked at the step 1012 is greater than zero (0), then, the RELEASE mode timer value L is decremented by one (1) at a step 1040 and thereafter process moves to the step 1014. When the RELEASE mode timer value L as decremented at the step 1040 is still held greater than zero (0), the answer at the step 1020 becomes positive since the RE EASE mode timer value is greater than zero. Then, process goes to a step 1042 to command the RELEASE mode skid control cycle period.

Operation of the aforementioned control system will be discussed hereinbelow. Assuming that the vehicle is in a state of parking and all acceleration sensors are acting in normal state, power supply for the fault detector circuit 23 and the control unit 25 is started in response to turning ON of the ignition switch. In response to starting of power supply, check is performed for the longitudinal and lateral acceleration sensors 22X and 22Y. At this time, since the vehicle is in parking state and assuming that the vehicle is parked on the flat and horizontal road, the longitudinal acceleration indicative signal value $X_G$ and the lateral acceleration indicative signal value $Y_G$ are both "zero" as long as the sensors are operating in normal state. Therefore, the output of the comparator 26b becomes zero. Consequently, the fault indicative signal AA at the output of the timer 26c is held LOW level.

At this time, the flipflop 35a in the fail-safe circuit 35 is maintained at a state reset by the leading edge of the ignition signal IG. Since the Q output of the flipflop 35a is held LOW level, the transistor 35b is maintained non-conductive. As a result, the fault alarm lamp 34a is held OFF. On the other hand, the switching transistor 35c is held ON for maintaining the relay coil x of the relay switch 71j energized for closing the normally open relay switch. As a result, the collector electrode of the transistor 71h and the emitter electrode of the transistor 71i are connected to the positive power source +B via the relay switch 71j.

At this time, since the fail-safe signal $AB_1$ of the fail-safe circuit 35 is held LOW level and the anti-skid active state indicative signal MR is also LOW level, the TM indicative signal of the power distribution deriving circuit 31 is selected by the multiplexer 36. At this time, since the vehicle is in the parking state, the wheel speed indicative signal $N_{FL}$, $N_{FR}$ and $N_R$ output from the wheel speed sensors 21FL, 21FR and 21R are held zero. Therefore, the wheel speed indicative data $Vw_{FL}$, $Vw_{FR}$ and $Vw_R$ derived by the wheel speed deriving circuits 41FL, 41FR and 41R and the wheel speed difference ΔVw derived by the wheel speed difference deriving circuit 42 are zero. Therefore, the TM indicative signal derived by the power distribution deriving circuit 31 is held zero. Therefore, the solenoid 20g is held inoperative state to maintain the clutch disengaged. Therefore, the output torque of the engine is transmitted only to the rear wheels 2RL and 2RR via the propeller shaft 10. At this position, the vehicle is started to run setting the transmission 5 in two wheel drive mode.

Here, assuming that the vehicle travels on a dry and high friction road, the average wheel speed $Vw_R$ of the rear wheels 2RL and 2RR as the driving wheel is substantially equal to the wheel speed $Vw_{FL}$ and $Vw_{FR}$ of the front wheels 2FL and 2FR. Therefore, the wheel speed difference ΔVw derived by the wheel speed difference deriving circuit 42 is held substantially zero. Therefore, the clutch assembly is maintained disengaged for maintain the two wheel driving mode.

When the abrupt acceleration is then commanded or when the road surface condition is changed into low friction, such as wet condition or snow road condition, wheel slippage is caused in the driving wheel 2RL and 2RR. As a result, the average rear wheel speed $Vw_R$ becomes higher than the front wheel speeds $Vw_{FL}$ and $Vw_{FR}$. Therefore, the wheel speed difference ΔVw is increased according to increasing of the wheel slippage. Accordingly, the TM indicative signal value derived by the power distribution deriving circuit 31 becomes increased for energizing the solenoid 20g by turning ON the power transistor 20x. Therefore, the clutch is engaged for making the transfer unit 6 active. Therefore, the part of the driving torque from the transmission is transmitted to the front wheels 2FL and 2FR via the gear train 17 and the front side output shaft 7. The vehicle is thus driven in four wheel drive mode.

At this four wheel drive mode, if the steering operation for a relatively large steering angle is performed, a lateral acceleration is exerted on the vehicle body. As a result, the lateral acceleration indicative signal $Y_G$ output from the lateral acceleration sensor 22Y is increased. The lateral acceleration indicative signal $Y_G$ processed by the input filter 43 and the gain deriving circuit 44. The gain deriving circuit 44 thus derives the gain K ($=a/Y_G$ : a is constant). As can be appreciated herefrom, according to increasing of the lateral acceleration indicative signal value $Y_G$, the gain K derived by the gain deriving circuit becomes smaller. The gain K derived in the gain deriving circuit 44 is used in the arithmetic circuit 45 for deriving the TM indicative signal value through the following equation:

$$TM = K \times |\Delta Vw|$$

Therefore, according to increasing of the lateral acceleration, the value of the TM indicative signal output from the power distribution deriving circuit 31 is decreased to lower the magnitude of the control current $I_{SOL}$ supplied to the solenoid 20g. This causes reduction of the engaging force to be exerted on the clutch assembly 20f to reduce ratio of driving torque to be delivered to the front wheels 2FL and 2FR. As can be appreciated, by reduction of the driving torque to be distributed to the front wheels, the steering characteristics is changed toward over-steer characteristics.

On the other hand, when the brake pedal is depressed for abrupt deceleration, anti-skid brake control becomes active. Basically, anti-skid brake control is triggered in response to wheel deceleration (negative acceleration)

being increased across a predetermined deceleration threshold or, in the alternative in response to wheel slippage increased across a predetermined wheel slippage threshold.

When the anti-skid brake control becomes active, the anti-skid active state indicative signal MR becomes HIGH level. Therefore, the multiplexer 36 selects the $T_{ABS}$ indicative signal of the power distribution deriving circuit 33 for controlling the engaging force of the clutch assembly 16 in the transfer unit 6. The power distribution deriving circuit 33 utilizes the engine speed data N as derived by the engine speed derivation circuit 33a. The arithmetic circuit 33b of the power distribution deriving circuit 33 multiplies the engine speed data N by a predetermined constant b to derive the $T_{ABS}$ indicative signal. Therefore, the engaging force of the clutch assembly 16 is controlled by the $T_{ABS}$ indicative signal. At this time, since the $T_{ABS}$ indicative signal value is derived irrespective of the wheel speed, influence of wheel speed variation caused by action of the anti-skid brake control can be successfully avoided.

Figure 8:
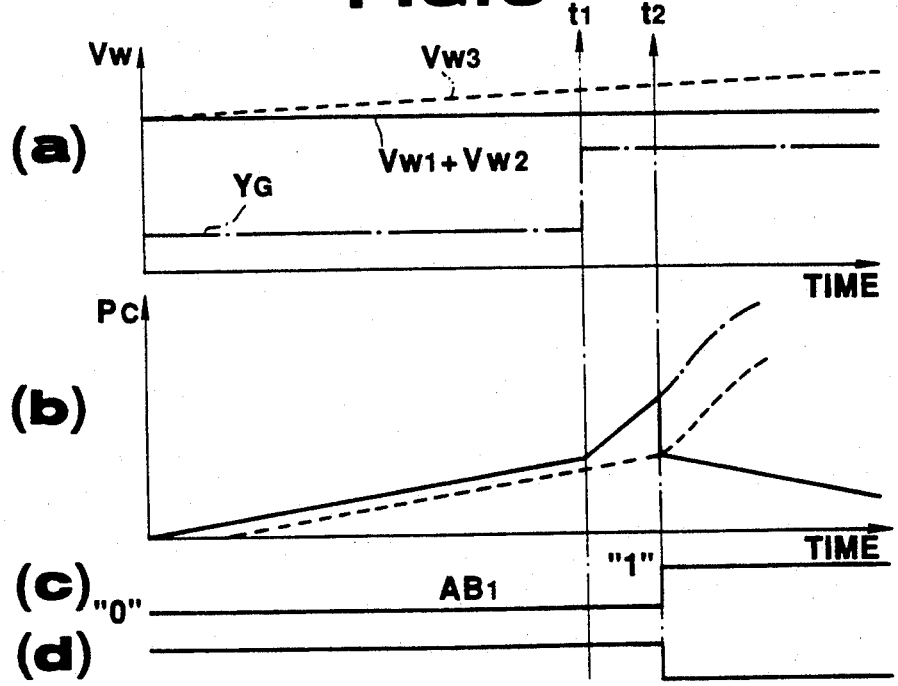
FIG. 8 is a timing chart showing operation of the preferred embodiment of the automotive activity control system of FIG. 2.

FIG. 8 illustrates a failure condition of the lateral acceleration sensor 22Y at a time $t_1$. The lateral acceleration indicative signal $Y_G$ represents the lateral acceleration magnitude greater than that actually exerted on the vehicular body, as shown by broken line in FIG. 8(a). Because the TM indicative signal value is derived utilizing the gain K which is variable depending upon the magnitude of the lateral acceleration indicative signal $Y_G$ and is decreased according to increasing of the lateral acceleration, the engaging force for the clutch assembly 16 can be reduced to be smaller than that should be in view of the actually exerted lateral acceleration, according to increasing of the TM indicative signal value as shown by solid line in FIG. 8(b).

On the other hand, at the time $T_1$, the output value of the arithmetic circuit 26a becomes increased. As a result, the output of the comparator 26b turns into HIGH level. Therefore, the output level of the timer 26c turns into HIGH level after expiration of the predetermined period of time, e.g. 0.5 sec. Therefore, HIGH level fault indicative signal AA is supplied to the fail-safe circuit 35. The flipflop 35a of the fail-safe circuit 35 is thus set by the HIGH level fail indicative signal AA. This turns the Q output level of the flipflop into HIGH level to supply an electric power to the alarm lamp to turn the latter ON. Since this HIGH level Q output of the flipflop 35a is supplied to the multiplexer 36, the multiplexer selects the $T_{FS}$ indicative signal of the engaging force reducing magnitude deriving circuit 32 for controlling the engaging force of the clutch assembly 16.

The engaging force reducing magnitude derivation circuit 32 becomes active for latching the TM indicative signal value at the occurrence of the fault indicative signal AA by charging the capacitor 53 during a period determined by the FTE 52 and the one-shot multivibrator 51. The engaging force reducing magnitude derivation circuit 32 is responsive to the fail-safe signal $AB_1$ to turn OFF the FET 55 at a time $t_2$. The intergration circuit 56 then starts integration with taking the constant voltage +B as the initial value. The integrated value decreases according to expansion of the integration period and is supplied to the adder 57. The output of the adder 57 is thus decreased from the initially latched value according to 130 expansion of the period to maintain the fail-safe signal $AB_1$. Therefore, the engaging force is gradually decreased to zero for switching driving mode from the four wheel drive mode to the two wheel drive mode. This results in reduction of cornering force at the rear wheels for preventing the driving wheels (rear wheels) from causing spinning and thus assures vehicular driving stability.

Similarly, when the longitudinal acceleration sensor 22X causes failure to have greater value than the logitudinal acceleration actually exerted on the vehicular body, the output of the arithmetic circuit is increased according to increasing of the longitudinal acceleration to cause HIGH level comparator signal of the comparator 26b. Therefore, after expiration of the predetermined period of time, e.g. 0.5 sec., the fail-safe signal $AB_1$ is output.

Therefore, with the foregoing embodiment, safety can be assured even when failure is caused in either of the longitudinal and lateral acceleration sensor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

Figure 14:
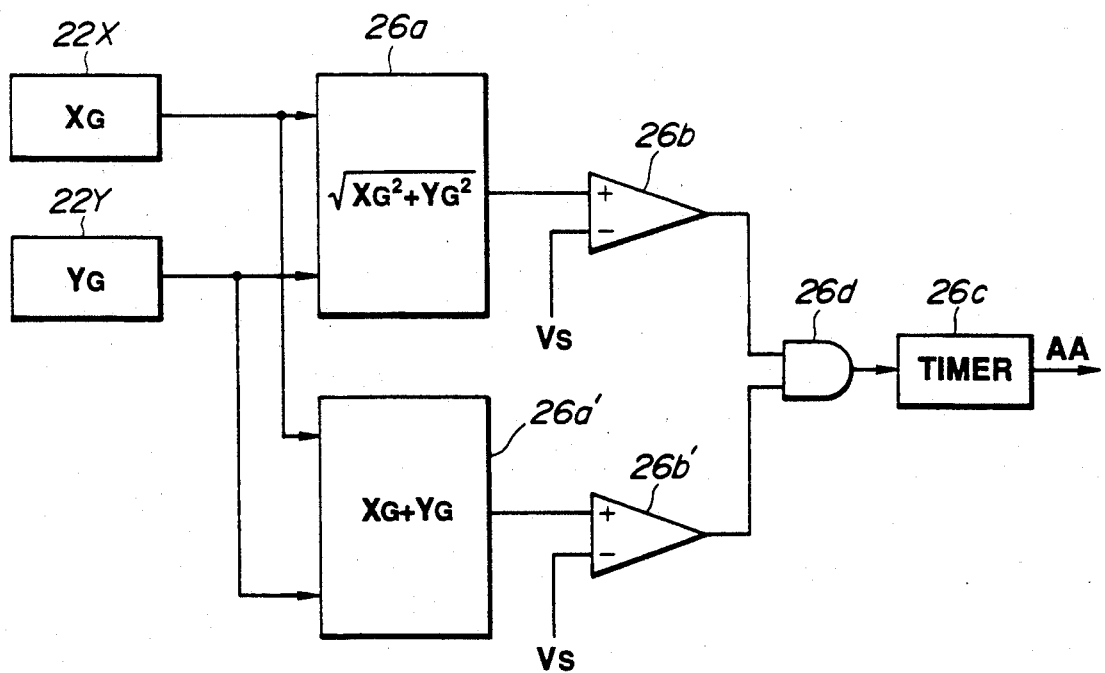
FIG. 14 is a block diagram of another embodiment of an automotive activity control system according to the invention.

For example, FIG. 14 shows modification of the fault detector circuit 23 to be employed in the foregoing embodiment of the control system of FIG. 2. IN the shown modification, another arithmetic circuit 26a' which derives a sum of the lateral acceleration indicative signal value $Y_G$ and the longitudinal acceleration indicative signal $X_G$. The output of the arithmetic circuit 26a' is input to a comparator 26b'. The comparator 26b' compares the output of the arithmetic circuit 26a' with the reference value Vs. Output of the comparator 26b, is input to an AND gate 26d together with the comparator output of the comparator 26b, which AND gate 26d is connected to the timer 26c for supplying the gate signal. An OR gate may be used in place of the AND gate.

In addition, though the shown embodiment is applied for the automotive vehicle having selective four wheel drive mode and rear wheel drive power train layout, the invention is, of course application for the vehicle having selective four wheel drive and front wheel drive power train layout. Also, though the shown embodiment employs wet-type clutch assembly in the transfer unit, the electromagnetic clutch may also be used for switching power train mode. Furthermore, though the shown embodiment employs the electric motor for driving the oil pump serving as the pressure source, it may be possible to use other type of power source, such as engine. Also, the pressure control valve for controlling the engaging force of the clutch assembly of the transfer unit may be replaced with a pressure reduction valve or relief valve for adjusting the engaging force.

On the other hand, though the specific type of anti-skid brake control system has been discussed hereabove, the shown embodiment should not be limited the application to the specific arrangement of the anti-skid brake control system but is applicable for any of anti-skid brake control systems. For example, process of derivation of the wheel speed indicative analog data and the wheel acceleration indicative data, and process of anti-skid brake control have been disclosed in the following United States Patents, all owned by the common assignee to the present invention.

U.S. Pat. No. 4,408,290, issued on Oct. 4, 1983
U.S. Pat. No. 4,674,049, issued on Jun. 16, 1987
U.S. Pat. No. 4,704,684, issued on Nov. 3, 1987
U.S. Pat. No. 4,663,715, issued on May 5, 1987
U.S. Pat. No. 4,663,716, issued on May 5, 1987
U.S. Pat. No. 4,660,146, issued on Apr. 21, 1987
U.S. Pat. No. 4,665,491, issued on May 12, 1987
U.S. Pat. No. 4,780,818, issued on Oct. 25, 1988
U.S. Pat. No. 4,674,050, issued on Jun. 16, 1987
U.S. Pat. No. 4,680,714, issued on Jul. 14, 1987
U.S. Pat. No. 4,682,295, issued on Jul. 21, 1987
U.S. Pat. No. 4,680,713, issued on Jul. 145, 1987
U.S. Pat. No. 4,669,046, issued on May 26, 1987

U.S. Pat. No. 4,669,045, issued on May 26, 1987
U.S. Pat. No. 4,679,146, issued on Jul. 7, 1987
U.S. Pat. No. 4,656,588, issued on Apr. 7, 1987
U.S. Pat. No. 4,718,013, issued on Jan. 5, 1988
U.S. Pat. No. 4,569,560, issued on Feb. 11, 1986
U.S. Pat. No. 4,662,686, issued on May 5, 1987
U.S. Pat. No. 4,667,176, issued on May 19, 1987
U.S. Pat. No. 4,597,052, issued on Jun. 24, 1986
U.S. Pat. No. 4,637,663, issued on Jan. 20, 1987
U.S. Pat. No. 4,683,537, issued on Jul. 28, 1987

The disclosure of the above-identified United States Patents will be herein incorporated by reference for the sake of disclosure.

What is claimed is:

1. In an automotive control system employing a lateral acceleration sensor for monitoring lateral acceleration exerted on a vehicular body and a longitudinal acceleration sensor for monitoring longitudinal acceleration exerted on the vehicular body as control parameters, a fault detecting system for detecting failure of said lateral and longitudinal acceleration sensors, comprising:

first means for deriving a data value, said first means comprising receiving means for receiving a lateral acceleration indicative signal output from said lateral acceleration sensor and a longitudinal acceleration indicative signal output from said longitudinal acceleration sensor and summing means for summing said lateral acceleration indicative signal and said longitudinal acceleration indicative signal; and second means for detecting a faulty state of one of said lateral and longitudinal acceleration sensors, said second means comprising comparing means for comparing said data value with a predetermined reference value and indication means for producing a faulty indication signal in response to said comparing means.

2. A fault detecting system as set forth in claim 1, wherein said first means derives said data value by deriving a sum of the squares of the respective lateral and longitudinal acceleration indicative signal values and deriving the square root of said sum.

3. A fault detecting system as set forth in claim 2, which further comprises a third means for deriving a sum value of said lateral and longitudinal acceleration indicative signals, a fourth means for comparing said sum value with said reference value for deriving a secondary faulty state indicative signal, and an AND gate receiving said faulty state indicative signals from said second means and third means for outputting a faulty state indicative gate signal when AND condition is established.

4. A fault detecting system as set forth in claim 3, which further comprises a timer means triggered by said faulty state indicative gate signal for outputting a fault indicative output signal when said faulty state indicative signal is maintained for a predetermined period of time.

5. A fault detecting system as set forth in claim 1, wherein said second means detects occurrence of failure of said lateral and longitudinal acceleration sensors when said data value is greater than said reference value.

6. A fault detecting system as set forth in claim 1, which further comprises a timer means triggered by said faulty state indicative signal for outputting a fault indicative output signal when said faulty state indicative signal is maintained for a predetermined period of time.

7. An automotive activity control system for controlling vehicular driving behaviour affected by accelerations exerted on the vehicular body, comprising:

a first acceleration sensor for monitoring a first acceleration exerted on the vehicular body in a first direction to produce a first acceleration indicative signal;

a second acceleration sensor for monitoring a second acceleration exerted on the vehicular body in a second direction which is different from said first direction to produce a second acceleration indicative signal;

a vehicular driving condition sensor for monitoring a vehicular driving condition for producing a control parameter indicative signal which represents vehicular driving parameters affecting vehicular driving behaviour;

first means provided for controlling operation of a vehicular component for controlling vehicular driving behaviour according to said first acceleration indicative signal, said second acceleration indicative signal and said control parameter indicative signal, said first means being operable in a first normal control mode and a second fail-safe mode;

second means receiving said first acceleration indicative signal output from said first acceleration sensor and said second acceleration indicative signal output from said second acceleration sensor for deriving a data value based on the sum of both of said first acceleration indicative signal and said second acceleration indicative signal;

third means comprising comparing means for comparing said data value with a predetermined reference value for detecting a faulty state of one of said first and second acceleration sensors and command means for commanding said fail-safe mode operation of said first means.

8. A control system as set forth in claim 7, wherein said second means derives said data value by deriving the sum of the squares of the respective first and second acceleration indicative signal values and deriving the square root of said sum.

9. A fault detecting system as set forth in claim 8, which further comprises a fourth means deriving a sum value of said first and second acceleration indicative signals, a fifth means for comparing said sum value with said reference value for deriving a secondary faulty state indicative signal, and an AND gate receiving said faulty state indicative signals from said third means and fifth means for outputting a faulty state indicative gate signal when the AND condition is established.

10. A fault detecting system as set forth in claim 9, which further comprises a timer means triggered by said faulty state indicative gate signal for outputting a fault indicative output signal when said faulty state indicative signal is maintained for a predetermined period of time.

11. A control system as set forth in claim 7, wherein said third means detects occurrence of failure of said first and second acceleration sensors when said data value is greater than said reference value.

12. A fault detecting system as set forth in claim 7, which further comprises a timer means triggered by said faulty state indicative signal for outputting a fault indicative output signal when said faulty state indicative signal is maintained for a predetermined period of time.

13. A power train control system for adjusting transmitting output torque of a prime mover of a vehicle distributed to front and rear wheels, comprising:
   a first acceleration sensor for monitoring a first acceleration exerted on the vehicular body in a first direction to produce a first acceleration indicative signal;
   a second acceleration sensor for monitoring a second acceleration exerted on the vehicular body in a second direction which is different from said first direction to produce a second acceleration indicative signal;
   a third sensor for monitoring a preselected vehicle driving parameter representative of a vehicular driving condition as a power train control parameter and for producing a parameter indicative signal;
   first means provided for adjusting distribution rate of said output torque on the basis of at least a selected one of said first and second acceleration indicative signals and said parameter indicative signal, said first means being operable in a first normal control mode and a second fail-safe mode;
   second means receiving said first acceleration indicative signal output from said first acceleration sensor and said second acceleration indicative signal output from said second acceleration sensor for deriving a data value based on the sum of both of said first acceleration indicative signal and said second acceleration indicative signal;
   third means for comparing said data value with a predetermined reference value for detecting faulty state of one of said first and second acceleration sensors for commanding said fail-safe mode operation of said first means.

14. A control system as set forth in claim 13, wherein said third sensor means includes a first wheel speed sensor monitoring wheel speed of a front wheel to produce a first wheel speed indicative signal and a second wheel speed sensor monitoring wheel speed at a rear wheel to produce a second wheel speed indicative signal, and said first means operates for adjusting said output torque to deliver said output torque to a primary driving wheel for driving the vehicle in two wheel driving mode when a difference between said first and second wheel speed indicative signal values is zero and for increasing the delivery ratio of said output torque to be delivered to a secondary driving wheel in accordance with an increase of said difference, in said first normal mode, and for relatively gradually decreasing said delivery ratio of said output torque to said secondary driving wheel to zero in said second fail-safe mode.

15. A control system as set forth in claim 14, wherein said first acceleration sensor monitors lateral acceleration exerted on the vehicular body and said first means includes means for generating a gain which is variable and decreased in proportion to an increase of said first acceleration indicative signal value for reducing the delivery ratio of said output torque to said secondary driving wheel according to increasing of magnitude of said lateral acceleration.

16. A control system as set forth in claim 15, wherein said primary driving wheel is a rear wheel and said secondary driving wheel is a front wheel.

17. A control system as set forth in claim 13, which is associated with an anti-skid brake control system to switch operation mode into a third mode in which distribution of said output torque is determined on the basis of an engine revolution speed.

18. A control system as set forth in claim 13, wherein said second means derives said data value by deriving the sum of the squares of the respective first and second acceleration indicative signal values and deriving the square root of said sum.

19. A controls system as set forth in claim 18, which further comprises a fourth means deriving a sum value of said first and second acceleration indicative signals, a fourth means for comparing said sum value with said reference value for deriving a secondary faulty state indicative signal, and an AND gate receiving said faulty state indicative signals from said third means and fifth means for outputting a faulty state indicative gate signal when the AND condition is established.

20. A control system as set forth in claim 19, which further comprises a timer means triggered by said faulty state indicative gate signal for outputting a fault indicative output signal when faulty state indicative signal is maintained for a predetermined period of time.

21. A control system as set forth in claim 13, wherein said third means detects occurrence of failure of said first and second acceleration sensors when said data value is greater than said reference value.

22. A control system as set forth in claim 13, which further comprises a timer means triggered by said faulty state indicative signal for outputting a fault indicative output signal when faulty state indicative signal is maintained for a predetermined period of time.

23. A power train control system for adjusting transmitting output torque of a prime over of a vehicle distributed to front and rear wheels in cooperation with an anti-skid brake control system, said brake control system adjusting braking pressure in wheel cylinders for controlling wheel slippage during braking operation at a predetermined optimum level, comprising:
   a sensor for monitoring a preselected vehicle driving parameter representative of a vehicular driving condition as a power train control parameter and for producing parameter indicative signals;
   first means provided for adjusting distribution rate of said output torque on the basis of said parameter indicative signals, said first means being operable in a first mode for deriving distribution of said output torque wherein said parameter indicative signals indicate a wheel speed difference between a primary and secondary driving wheels, and a second mode for deriving said distribution ratio of said output torque wherein said parameter indicative signals indicate an engine revolution speed;
   second means for commanding said first mode operation of said first means while the anti-skid brake control is held in inactive state and commanding said second mode operation while said anti-skid brake control system is active; and a fault detecting system including:

summing means for summing (i) a first acceleration indicative signal output from said first acceleration sensor and (ii) a second acceleration indicative signal output from said longitudinal acceleration sensor for deriving a data value based on a sum of said first acceleration indicative signal and said second acceleration indicative signal, and comparing means for comparing said data value with a predetermined reference value for detecting faulty state of one of said first and second acceleration sensors for producing a faulty state indicative signal.

24. A control system as set forth in claim 23, which further comprises a first acceleration sensor for monitoring first acceleration exerted on the vehicular body in a first direction to produce a first acceleration indicative signal, a second acceleration sensor for monitoring second acceleration exerted on the vehicular body in a second direction which is different from said first direction to produce a second acceleration indicative signal, and third means for receiving said first acceleration indicative signal output from said first acceleration sensor and said second acceleration indicative signal output from said second acceleration sensor for deriving a data value based on both of said first acceleration indicative signal and said second acceleration indicative signal, and a fourth means for comparing said data value with a predetermined reference value for detecting faulty state of one of said first and second acceleration sensors for commanding fail-safe mode operation for reducing distribution ratio of said output torque to a secondary wheel to zero.

25. A fault detecting system as set fourth in claim 23, wherein said second means detects occurrence of failure of said first and second acceleration means when said data value is greater than said reference value.

26. A power train control system for adjusting transmitting output torque of a prime mover of a vehicle distributed to front and rear wheels in cooperation with an anti-skid brake control system, said brake control system adjusting braking pressure in wheel cylinders for controlling wheel slippage during braking operation at a predetermined optimum level, comprising:

a sensor for monitoring a preselected vehicle driving parameter representative of a vehicular driving condition as a power train control parameter and for producing parameter indicative signals;

first means provided for adjusting distribution rate of said output torque on the basis of said parameter indicative signals, said first means being operable in a first mode for deriving distribution of said output torque wherein said parameter indicative signals indicate a wheel speed difference between a primary and secondary driving wheels, and a second mode for deriving said distribution ratio of said output torque wherein said parameter indicative signals indicate an engine revolution speed;

second means for commanding said first mode operation of said first means while the anti-skid brake control is held in inactive state and commanding said second mode operation while said anti-skid brake control system is active; and a fault detecting system including:

third means for receiving (i) a first acceleration indicative signal output from said first acceleration sensor and (ii) a second acceleration indicative signal output from said longitudinal acceleration sensor for deriving a data value by deriving the sum of the squares of the respective first and second acceleration indicative signal values and deriving the square root of said sum, and fourth means for comparing said data value with a predetermined reference value for detecting faulty state of one of said first and second acceleration sensors for producing a faulty state indicative signal.

* * * * *